(12) United States Patent
Fujishiro et al.

(10) Patent No.: US 10,904,811 B2
(45) Date of Patent: Jan. 26, 2021

(54) BASE STATION AND USER TERMINAL

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/762,747

(22) PCT Filed: Jun. 29, 2016

(86) PCT No.: PCT/JP2016/069322
§ 371 (c)(1),
(2) Date: Mar. 23, 2018

(87) PCT Pub. No.: WO2017/051580
PCT Pub. Date: Mar. 30, 2017

(65) Prior Publication Data
US 2018/0288666 A1 Oct. 4, 2018

Related U.S. Application Data

(60) Provisional application No. 62/232,998, filed on Sep. 25, 2015.

(51) Int. Cl.
H04W 36/22 (2009.01)
H04W 68/00 (2009.01)
(Continued)

(52) U.S. Cl.
CPC .......... *H04W 36/22* (2013.01); *H04W 48/12* (2013.01); *H04W 48/20* (2013.01); *H04W 68/00* (2013.01); *H04W 68/005* (2013.01)

(58) Field of Classification Search
CPC ..... H04W 36/22; H04W 48/12; H04W 48/20; H04W 68/00; H04W 68/005
See application file for complete search history.

(56) References Cited

U.S. PATENT DOCUMENTS

| 7,224,976 B2 * | 5/2007 | Artamo | H04W 16/14 455/422.1 |
| 8,310,946 B2 * | 11/2012 | Somasundaram | H04J 11/0093 370/252 |

(Continued)

OTHER PUBLICATIONS

International Search Report issued in PCT/JP2016/069322; dated Jul. 26, 2016.

(Continued)

*Primary Examiner* — Huy D Vu
*Assistant Examiner* — Bailor C. Hsu
(74) *Attorney, Agent, or Firm* — Studebaker & Brackett PC

(57) ABSTRACT

A user terminal according to a first aspect comprises a controller. If the user terminal is in an RRC idle state, the controller executes the processes of: receiving, from a base station, a cell-specific priority applied to a cell reselection process for a load redistribution; receiving, from the base station, an identifier indicating that the cell-specific priority is applied only to the cell reselection process triggered by using a paging message; receiving, from the base station, the paging message including an instruction to trigger the cell reselection process; and executing the cell reselection process by using the cell-specific priority, in response to the reception of the paging message.

6 Claims, 15 Drawing Sheets

(51) Int. Cl.
*H04W 48/12* (2009.01)
*H04W 48/20* (2009.01)

(56) References Cited

U.S. PATENT DOCUMENTS

| | | | | |
|---|---|---|---|---|
| 8,467,798 | B2* | 6/2013 | Lee | H04W 36/22 |
| | | | | 455/450 |
| 8,532,660 | B2* | 9/2013 | Zou | H04W 48/20 |
| | | | | 455/436 |
| 9,042,883 | B2* | 5/2015 | Wang | H04J 11/0093 |
| | | | | 455/432.1 |
| 9,370,028 | B2* | 6/2016 | Chun | H04W 48/20 |
| 9,408,116 | B2* | 8/2016 | Pakniat | H04W 48/12 |
| 9,462,553 | B2* | 10/2016 | Gopal | H04W 52/0251 |
| 9,485,664 | B2* | 11/2016 | Jha | H04W 16/14 |
| 9,693,278 | B2* | 6/2017 | Yiu | H04W 36/26 |
| 9,736,765 | B2* | 8/2017 | Yiu | H04W 48/16 |
| 9,854,591 | B2* | 12/2017 | Yiu | H04W 72/082 |
| 2010/0291941 | A1* | 11/2010 | Chen | H04W 36/22 |
| | | | | 455/450 |
| 2012/0276945 | A1* | 11/2012 | Chindapol | H04W 48/20 |
| | | | | 455/525 |
| 2013/0183971 | A1* | 7/2013 | Tamaki | H04W 36/0061 |
| | | | | 455/436 |
| 2013/0303165 | A1* | 11/2013 | Hole | H04W 36/0055 |
| | | | | 455/435.2 |
| 2016/0073305 | A1* | 3/2016 | Yang | H04W 36/0083 |
| | | | | 455/436 |

OTHER PUBLICATIONS

3rd Generation Partnership Project; Technical Specification Group Radio Access Network; Evolved Universal Terrestrial Radio Access (E-UTRA); User Equipment (UE) procedures in idle mode; 3GPP TS 36.304 V12.4.0; Mar. 2015; pp. 1-38; Release 12; 3GPP Organizational Partners.

Kyocera; "Continuous VS One-Shot Distribution Mechanism for Reselection"; 3GPP TSG-RAN WG2 #91; R2-153775; Aug. 24-28, 2015; pp. 1-7; Beijing, China.

Kyocera; "Paging-Triggered Cell Specific Prioritization"; 3GPP TSG-RAN WG2 #91bis; R2-154692; Oct. 5-9, 2015; pp. 1-5; Malmo, Sweden.

* cited by examiner

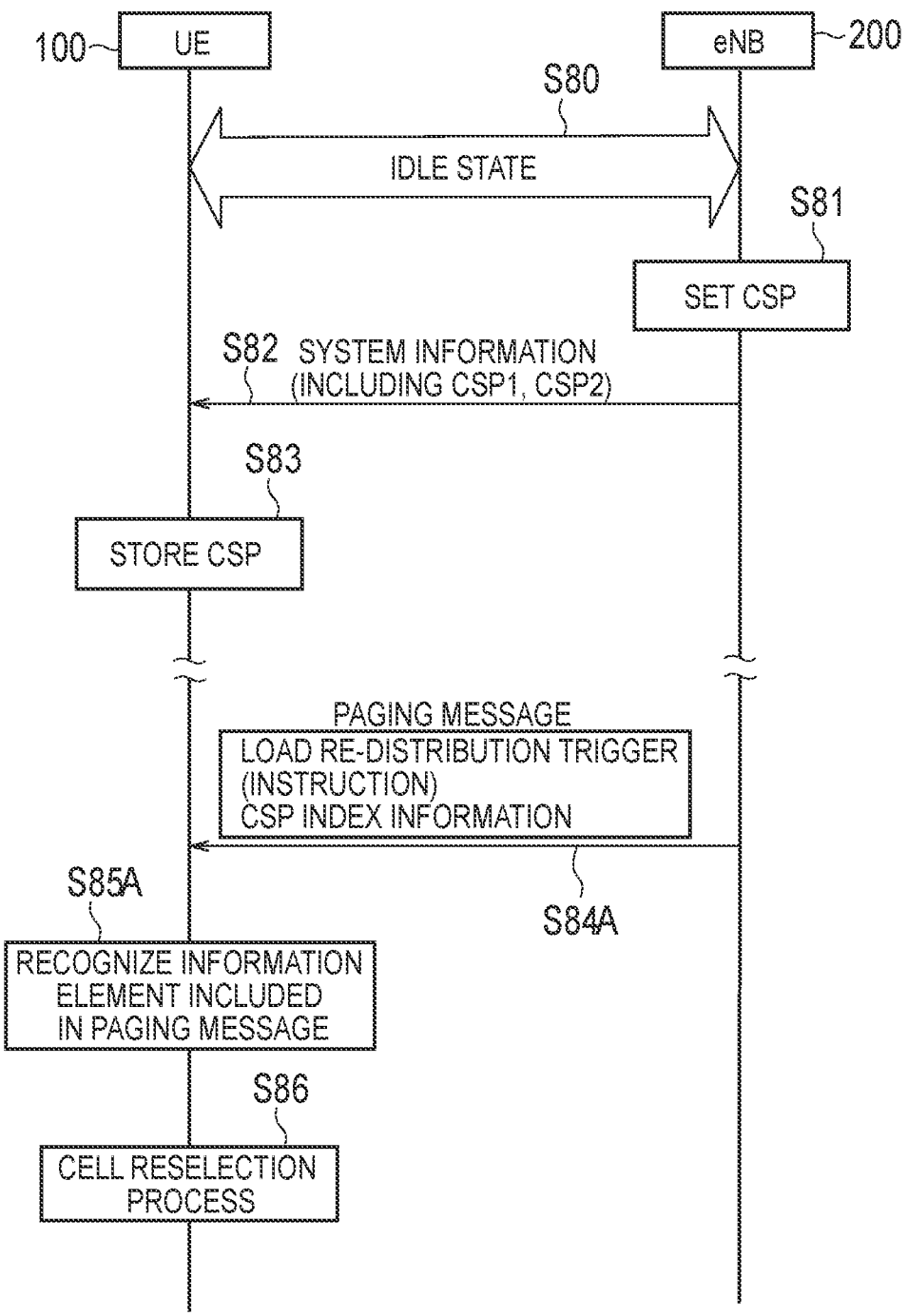

BASE STATION AND USER TERMINAL

CROSS REFERENCE

The entire contents of U.S. Provisional Application No. 62/232,998 (filed Sep. 25, 2015) are incorporated herein by reference.

TECHNICAL FIELD

The present invention relates to a base station and a user terminal configured to perform a process for selecting a target cell used as a serving cell from among a plurality of cells.

BACKGROUND ART

In 3GPP (3rd Generation Partnership Project), which is a project aiming to standardize a mobile communication system, a technology for selecting a target cell used as a serving cell from among a plurality of cells operated at different frequencies, has been proposed (for example, Non Patent Document 1).

Specifically, a user terminal measures, if a start condition is satisfied, a quality of an adjacent cell adjacent to a current serving cell, and selects, from among cells that satisfy a selection condition, a target cell used as a serving cell.

PRIOR ART DOCUMENT

Non-Patent Document

Non Patent Document 1: 3GPP Technical Report "TS 36.304 V12.4.0" March, 2015

A user terminal according to a first aspect comprises a controller. If the user terminal is in an RRC idle state, the controller executes the processes of: receiving, from a base station, a cell-specific priority applied to a cell reselection process for a load redistribution; receiving, from the base station, an identifier indicating that the cell-specific priority is applied only to the cell reselection process triggered by using a paging message; receiving, from the base station, the paging message including an instruction to trigger the cell reselection process; and executing the cell reselection process by using the cell-specific priority, in response to the reception of the paging message.

A base station according to a second aspect comprises a controller. The controller executes the processes of: broadcasting a cell-specific priority applied to a cell reselection process for a load redistribution; broadcasting an identifier indicating that the cell-specific priority is applied only to the cell reselection process triggered by using a paging message; and broadcasting the paging message including an instruction to trigger the cell reselection process.

BRIEF DESCRIPTION OF THE DRAWINGS

FIG. 17 is a diagram illustrating a process flow of a ninth embodiment.

DESCRIPTION OF EMBODIMENTS

Figure 1:
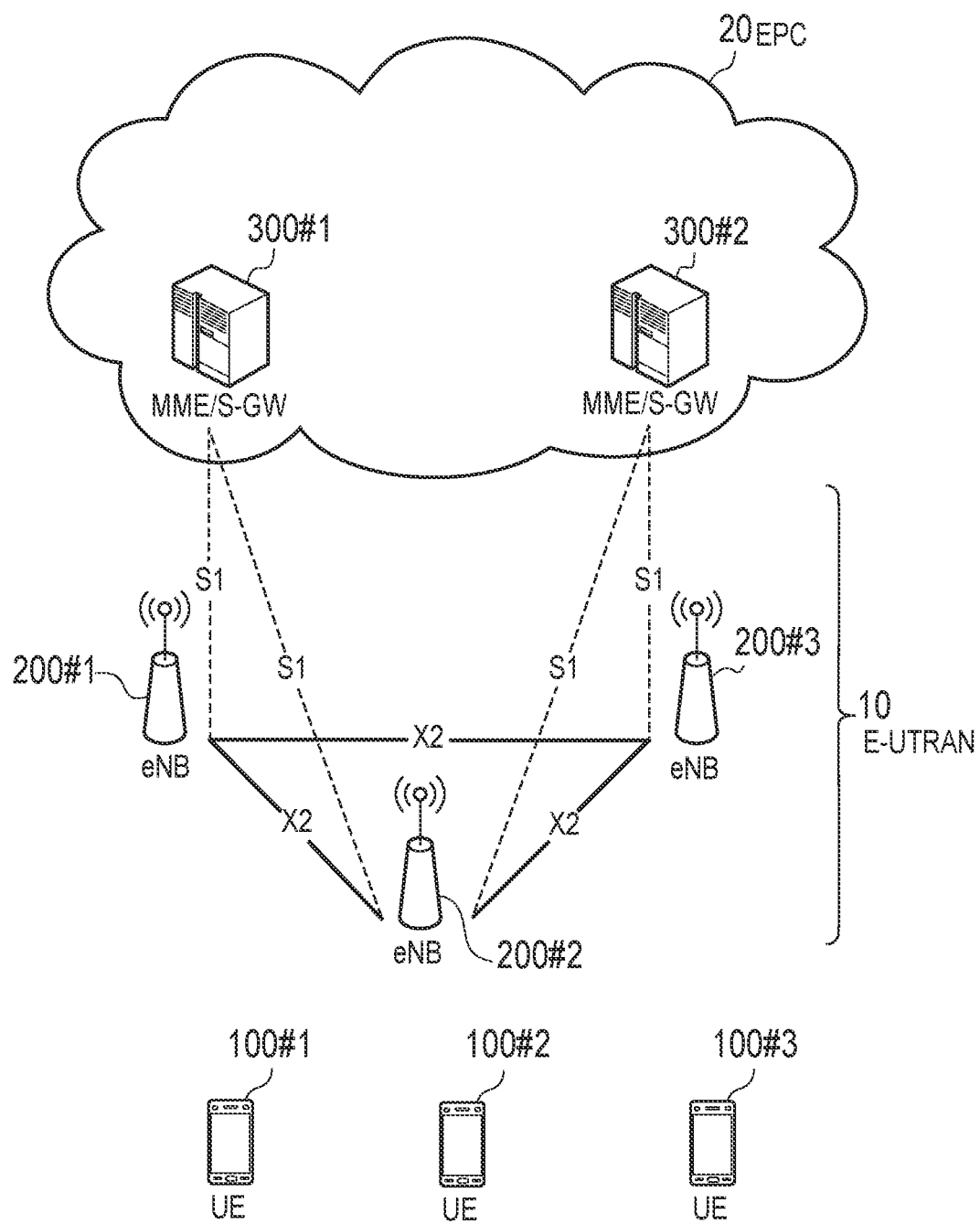
FIG. 1 is a configuration diagram of an LTE system according to an embodiment.

Hereinafter, a mobile communication system according to an embodiment will be described with reference to the accompanying drawings. In the following description of the drawings, the same or similar parts are denoted by the same or similar reference numerals.

It should be noted, however, that the drawings are schematic, and ratios of dimensions or the like may be different from actual ones. Therefore, specific dimensions or the like should be determined with reference to the following description. Further, it will be appreciated that parts in which relations or ratios of dimensions are different between the drawings are included.

[Overview of Disclosure]

In the mobile communication system mentioned in the background art, the selection of the target cell to be used as the serving cell is performed on the basis of the quality of the neighbor cell. Therefore, the user terminals located at geographically close positions are likely to select the same cell as the target cell. Further, the geographical distribution of the user terminals is often biased. In other words, there is a possibility that the cell to be used as the serving cell by the user terminal may become biased to the same cell, and there is a possibility that the load distribution of the respective cells is not properly performed.

A user terminal according to the overview comprises a controller. If the user terminal is in an RRC idle state, the controller executes the processes of: receiving, from a base station, a cell-specific priority applied to a cell reselection process for a load redistribution; receiving, from the base station, an identifier indicating that the cell-specific priority is applied only to the cell reselection process triggered by using a paging message; receiving, from the base station, the paging message including an instruction to trigger the cell reselection process; and executing the cell reselection process by using the cell-specific priority, in response to the reception of the paging message.

Accordingly, it is possible to appropriately distribute the user terminals in the RRC idle state to the respective cells.

First Embodiment

An LTE system based on the 3GPP standard will be described below as an example of a mobile communication system.

(System Configuration)

A system configuration of an LTE system according to the first embodiment will be described. FIG. 1 is a configuration diagram of an LTE system according to the first embodiment.

The LTE system according to the first embodiment includes a user equipment (UE) 100, an evolved-UMTS terrestrial radio access network (E-UTRAN) 10, and an evolved packet core (EPC) 20 as illustrated in FIG. 1.

The UE 100 corresponds to a user terminal. The UE 100 is a mobile communication device, and performs radio communication with a cell formed by an evolved Node-B (eNB 200) (a serving cell in a case in which the UE 100 is in an RRC connected state). A configuration of the UE 100 will be described later.

The E-UTRAN 10 corresponds to a radio access network. The E-UTRAN 10 includes the eNB 200. The eNB 200 corresponds to a radio base station. The eNBs 200 are connected to each other via an X2 interface. A configuration of the eNB 200 will be described later.

The eNB 200 forms one or more cells and performs radio communication with the UE 100 that has established a connection with a cell thereof. The eNB 200 has a radio resource management (RRM) function, a user data routing function, a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs user data transfer control. The MME/S-GW 300 is connected to the eNB 200 via an S1 interface. The E-UTRAN 10 and the EPC 20 constitute a network of the LTE system.

Figure 2:
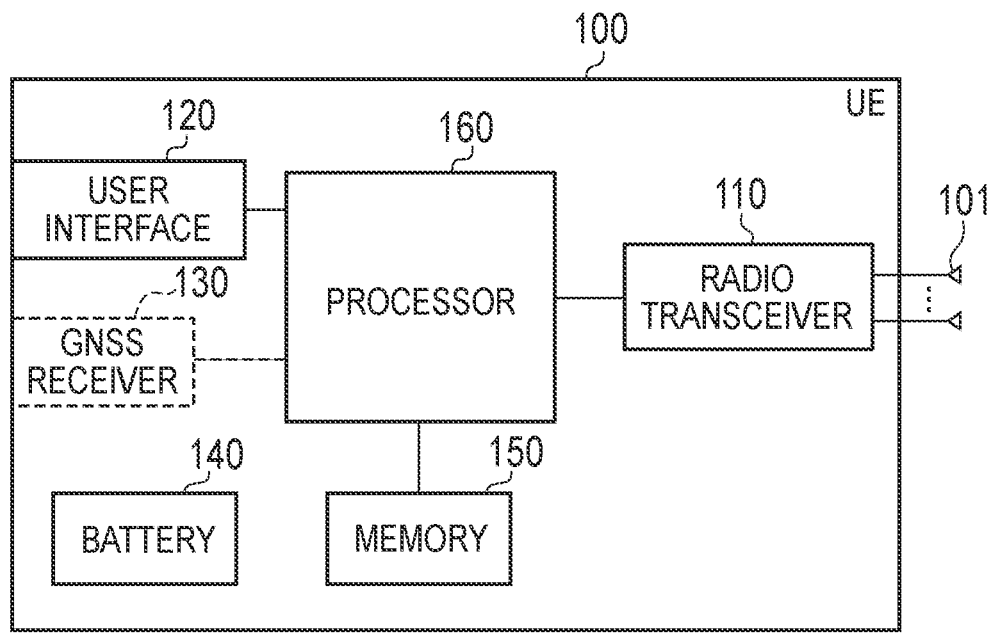
FIG. 2 is a block diagram of a UE 100 according to the embodiment.

FIG. 2 is a block diagram of the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller. The radio transceiver 110 and the processor 160 constitute a transmitter and a receiver. The UE 100 may not include the GNSS receiver 130. Further, the memory 150 may be integrated with the processor 160, and this set (that is, chipset) may be used as a processor.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. In addition, the radio transceiver 110 converts a radio signal received by the antenna 101 into a baseband signal (a reception signal) and outputs the baseband signal to the processor 160.

The user interface 120 is an interface with a user who owns the UE 100, and includes, for example, a display, a microphone, a speaker, various buttons, or the like. The user interface 120 receives an operation from the user and outputs a signal indicating content of the received operation to the processor 160. The GNSS receiver 130 receives a GNSS signal and outputs the received GNSS signal to the processor 160 in order to obtain position information indicating a geographical position of the UE 100. The battery 140 stores electric power to be supplied to the blocks of the UE 100.

The memory 150 stores a program executed by the processor 160 and information used for a process performed by the processor 160. The processor 160 includes a baseband processor that performs modulation/demodulation, encoding/decoding, and the like of the baseband signal and a central processing unit (CPU) that performs various kinds of processes by executing the program stored in the memory 150. The processor 160 may further include a codec that encodes and decodes audio and video signals. The processor 160 executes various kinds of processes to be described later and various kinds of communication protocols.

Figure 3:
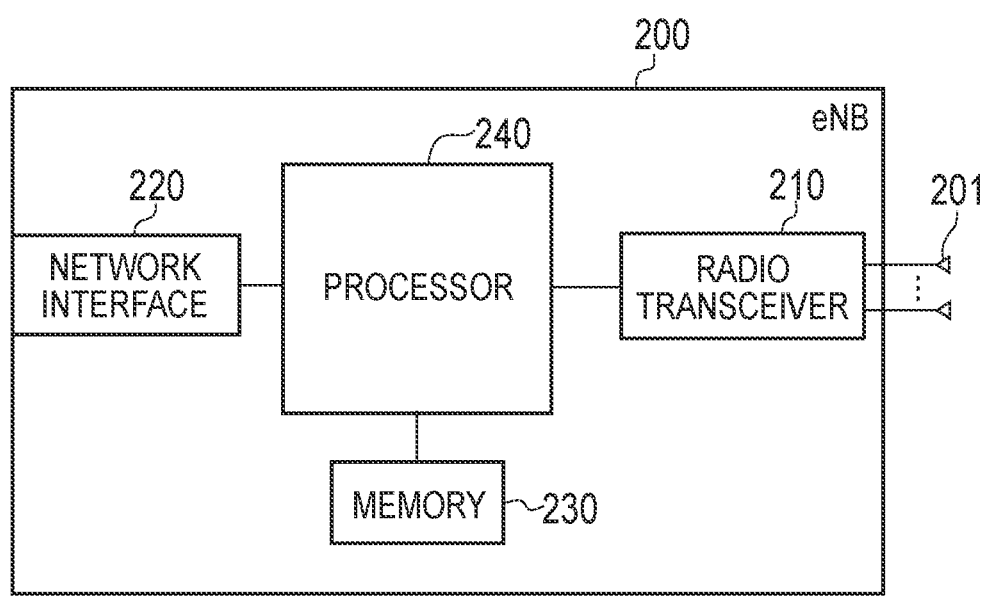
FIG. 3 is a block diagram of an eNB 200 according to the embodiment.

FIG. 3 is a block diagram of the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. The radio transceiver 210 (and/or the network interface 220) and the processor 240 constitute a transmitter and a receiver. Further, the memory 230 may be integrated with the processor 240, and this set (that is, chipset) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. Further, the radio transceiver 210 converts a radio signal received by the antenna 201 into a baseband signal (a reception signal) and outputs the baseband signal to the processor 240.

The network interface 220 is connected to a neighbor eNB 200 via an X2 interface and connected to the MME/S-GW 300 via an S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that performs modulation/demodulation, encoding/decoding, and the like of the baseband signal and a CPU that performs various kinds of processes by executing the program stored in the memory 230. The processor 240 executes various kinds of processes to be described later and various kinds of communication protocols.

Figure 4:
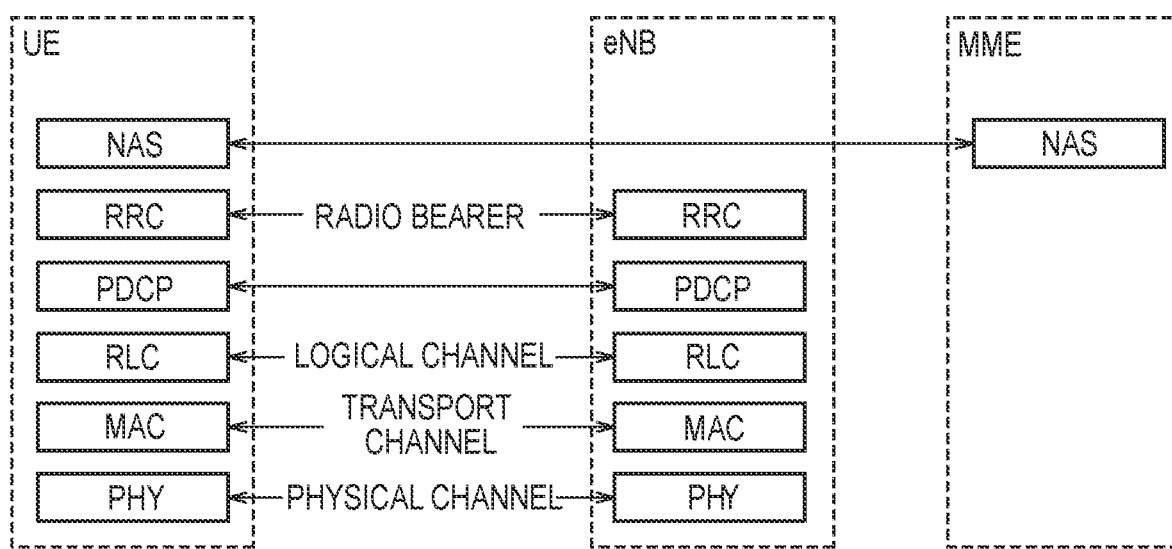
FIG. 4 is a protocol stack diagram of a radio interface according to the embodiment.

FIG. 4 is a protocol stack diagram of a radio interface in the LTE system. As illustrated in FIG. 4, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. User data and control information are transmitted between the physical layer of the UE 100 and the physical layer of the eNB 200 via the physical channel.

The MAC layer performs priority control of data, a retransmission process by hybrid ARQ (HARQ), a random access procedure, and the like. User data and control information are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. User data and control information are transmitted between the RLC layer of the UE 100 and the RLC layer of the eNB 200 via a logical channel.

The PDCP layer performs header compression/decompression and encryption/decryption. Further, it should be noted that a transmitting entity of transmitting a data unit (PDCP PDU) or a receiving entity of receiving a data unit (PDCP PDU) is formed in the PDCP layer.

The RRC layer is defined only on a control plane for dealing with control information. A control signal (an RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. In a case in which there is a connection (RRC connection) between the RRC of the UE 100 and the RRC of the eNB 200, the UE 100 is in an RRC connected state, and in a case in which there is no connection (RRC connection) between the RRC of the UE 100 and the RRC of the eNB 200, the UE 100 is in an RRC idle state.

A non-access stratum (NAS) layer located above the RRC layer performs session management, mobility management, and the like.

Figure 5:
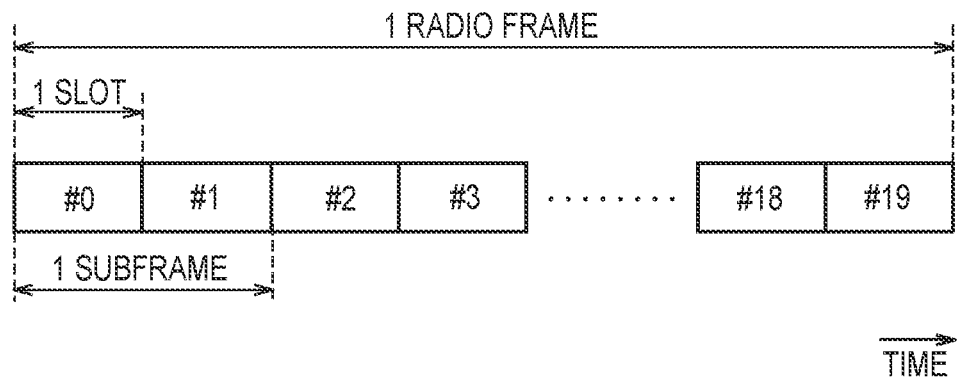
FIG. 5 is a configuration diagram of a radio frame used in the LTE system according to the embodiment.

FIG. 5 is a configuration diagram of a radio frame used in the LTE system. In the LTE system, orthogonal frequency division multiple access (OFDMA) is applied to downlink, and Single Carrier Frequency Division Multiple Access (SC-FDMA) is applied to uplink.

As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One resource element (RE) is constituted by one symbol and one subcarrier. Among the radio resources (time/frequency resources) allocated to the UE 100, frequency resources are able to be specified by resource blocks, and time resources is able to be specified by subframes (or slots).

(Application Scene)

Figure 6:
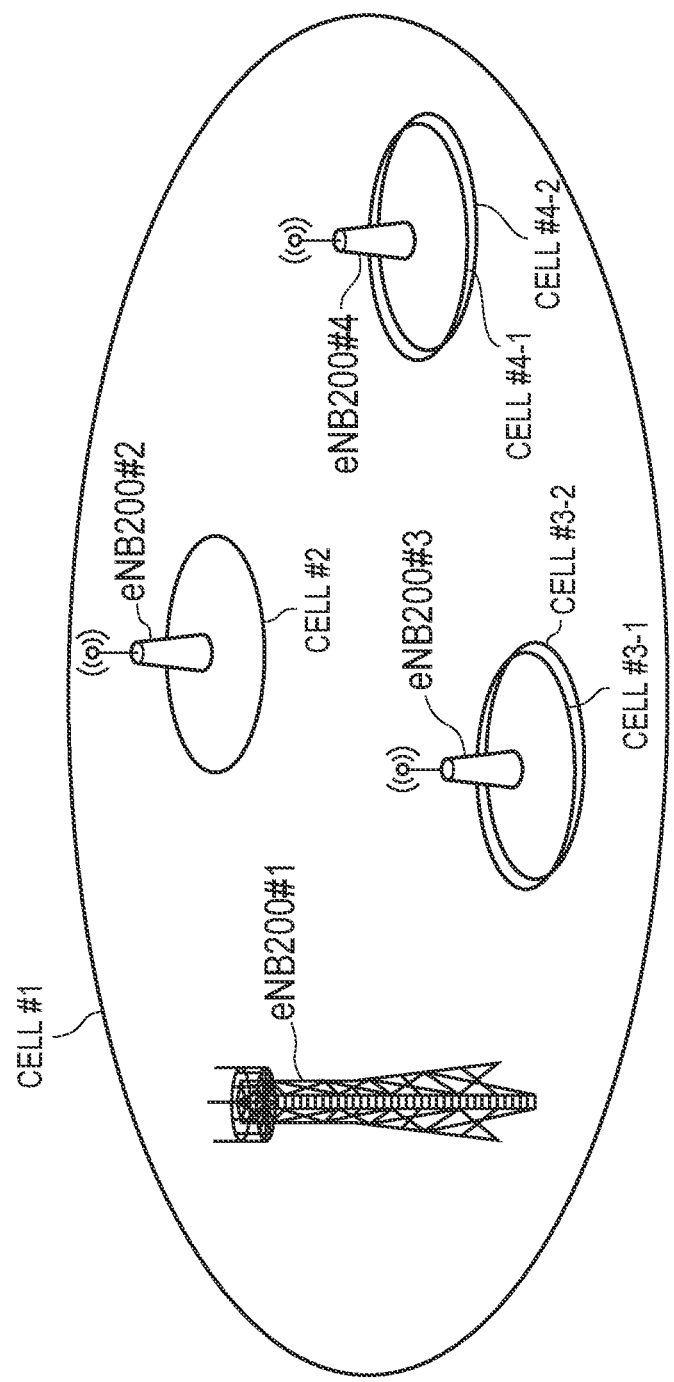
FIG. 6 is a diagram for describing an application scene according to the embodiment.

An application scene will be described, below. FIG. 6 is a diagram for describing an application scene according to the first embodiment.

As illustrated in FIG. 6, a plurality of eNBs 200 (for example, an eNB 200 #1, an eNB 200 #2, an eNB 200 #3, and an eNB 200 #4) are provided. The eNB 200 #1 has a cell #1 as a radio communication area, the eNB 200 #2 has a cell #2 as a radio communication area, the eNB 200 #3 has a cell #3-1 and a cell #3-2 as a radio communication area, and the eNB 200 #4 has a cell #4-1 and a cell #4-2 as a radio communication area.

It is noted that the cell #2, the cell #3-1, the cell #3-2, the cell #4-1, and the cell #4-2 overlap with the cell #1. Further, each cell is operated at respectively different frequencies. A priority is defined for the frequencies where each cell is operated. The correspondence relationship between the frequency and the priority is included in system information (SIB; System Information Block) broadcast from the eNB 200.

Under such a premise, the UE 100 selects the target cell used as a serving cell from among the plurality of cells operated at different frequencies. Specifically, the UE 100 measures, if a start condition is satisfied, the quality of an adjacent cell adjacent to the current serving cell, and selects, from among the cells that satisfy a selection condition, the target cell used as a serving cell.

Firstly, the start condition is shown as follows:

(A1) A frequency having a higher priority than the priority of the frequency of the current serving cell the UE 100 always measures the quality of the frequency having the higher priority.

(A2) A frequency having a priority equal to or lower than the priority of the frequency of the current serving cell the UE 100 measures, if the quality of the current serving cell falls below a predetermined threshold value, the quality of the frequency having the equal priority or the lower priority.

Secondly, the selection condition is shown as follows:

(B1) The priority of the frequency of the adjacent cell is higher than the priority of the current serving cell the UE 100 selects a cell that satisfies a relationship of $Squal > Thresh_{X, HighQ}$ over a predetermined period ($Treselection_{RAT}$), or a cell that satisfies a relationship of $Srxlev > Thresh_{X, HighP}$ over the predetermined period ($Treselection_{RAT}$) as the target cell. In such a case, such criteria to be satisfied by the adjacent cell may be referred to as "S-criteria".

It is noted that Squal represents a cell selection quality level, and is calculated by $Squal = Q_{qualmeas} - (Q_{qualmin} + Q_{qualminoffset}) - Qoffset_{temp}$. $Q_{qualmeas}$ is a quality level (RSRQ) of the adjacent cell, $Q_{qualmin}$ is a minimum required quality level, $Q_{qualminoffset}$ is a predetermined offset regularly applied to the adjacent cell, and $Qoffset_{temp}$ is an offset temporarily applied to the adjacent cell. $Thresh_{X, HighQ}$ is a predetermined threshold value.

Further, Srxlev represents a cell selection reception level, and is calculated by $Srxlev = Q_{rxlevmeas} - (Q_{rxlevmin} + Q_{rxlevminoffset}) - Pcompensation - Qoffset_{temp}$. $Q_{rxlevmeas}$ is a reception level (RSRP) of the adjacent cell, $Q_{rxlevmin}$ is a minimum required reception level, $Q_{rxlevminoffset}$ is a predetermined offset regularly applied to the adjacent cell, Pcompensation is a parameter related to an uplink capability, and $Qoffset_{temp}$ is an offset temporarily applied to the adjacent cell. $Thresh_{X, HighP}$ is a predetermined threshold value.

(B2) The priority of the frequency of the adjacent cell is the same as the priority of the current serving cell the UE 100 calculates a ranking $R_s$ of the current serving cell and a ranking $R_n$ of the adjacent cell, and selects a cell having a higher ranking $R_n$ than $R_s$ over a predetermined period ($Treselection_{RAT}$) as the target cell. In such a case, such criteria to be satisfied by the adjacent cell maybe referred to as "R-criteria".

It is noted that $R_s$ is calculated by $R_s = Q_{meas,s} + Q_{Hyst} - Qoffset_{temp}$. $R_n$ is calculated by $R_n = Q_{meas,n} - Qoffset - Qoffset_{temp}$. $Q_{meas,s}$ is the reception level (RSRP) of the current serving cell, and $Q_{meas,n}$ is the reception level (RSRP) of the adjacent cell. $Q_{Hyst}$ is a hysteresis value for achieving preferential reselection of the current serving cell as the target cell. $Qoffset_{temp}$ is an offset temporarily applied to the current serving cell and the adjacent cell.

(B3) The priority of the frequency of the adjacent cell is lower than the priority of the current serving cell the UE 100 selects, under a premise that $Squal < Thresh_{serving, LowQ}$ is satisfied over a predetermined period ($Treselection_{RAT}$), or $Srxlev < Thresh_{serving, LowP}$ is satisfied over the predetermined period (Treselection$_{RAT}$), the target cell from among the adjacent cells by a method similar to the above described (B1).

It is noted that Thresh$_{serving, LowQ}$ and Thresh$_{serving, LowP}$ are predetermined threshold values similarly to Thresh$_{X, HighQ}$ and Thresh$_{X, HighP}$.

It is noted that various types of parameters used for selecting the target cell are included in system information (SIB; System Information Block) broadcast from the eNB 200. The various types of parameters include the priority of the frequency (cellReselectionPriority), a predetermined period (Treselection$_{RAT}$), various types of offsets (Q$_{qualminoffset}$, Q$_{rxlevminoffset}$, Qoffset$_{temp}$, Q$_{Hyst}$, Qoffset), and various types of threshold values (Thresh$_{X, HighQ}$, Thresh$_{X, HighP}$, Thresh$_{serving, LowQ}$, Thresh$_{serving, LowP}$).

In the first embodiment, the UE 100 (controller) selects the target cell used as a serving cell from among a plurality of cells operated at different frequencies. Specifically, the UE 100 (controller) measures, even if the quality of the current serving cell satisfies a predetermined quality criteria, at a predetermined timing, the quality of the adjacent cell adjacent to the current serving cell. Here, "satisfying the predetermined quality criteria" means that the above-described start condition is not satisfied. More particularly, the predetermined quality criteria is, as described in the above-described (A2), a condition that the quality of the current serving cell does not fall below the predetermined threshold value.

In other words, the UE 100 (controller) according to the first embodiment is configured, in principle, if the quality of the current serving cell satisfies the predetermined quality criteria, not to start quality measurement of the adjacent cell adjacent to the current serving cell. However, it should be noted that the UE 100 (controller) exceptionally starts the quality measurement of the adjacent cell based on the system information received from the current serving cell, as described later.

Here, the UE 100 (controller) specifies the predetermined timing based on the system information (SIB; System Information Block) received from the current serving cell. It is noted that the predetermined timing means a timing at which the quality measurement of the adjacent cell is started accompanied with the selection of the target cell.

The system information may mean to immediately start the quality measurement of the adjacent cell. In such a case, the UE 100 (controller) specifies the timing at which the system information is received as the predetermined timing, and starts the quality measurement of the adjacent cell in response to reception of the system information.

Alternatively, the system information may include a subframe number at which the quality measurement of the adjacent cell should be started. The UE 100 (controller) specifies the subframe number included in the system information as the predetermined timing, and starts the quality measurement of the adjacent cell at the specified subframe number.

Alternatively, the system information may include information indicating a period of the predetermined timing. For example, the system information includes a timer value to be set to a timer activated at a timing when the quality measurement of the adjacent cell is terminated. The UE 100 (controller) specifies the timing at which the timer to which the timer value is set expires, as the predetermined timing, and starts the quality measurement of the adjacent cell at the specified timing.

Here, in a case where the system information includes the information indicating the period of the predetermined timing, the UE 100 (controller) may correct the period of the predetermined timing based on a value specific to the UE 100. The value specific to the UE 100 may be, for example, a subframe number for receiving the system information, or an identifier (UE-ID) of the UE 100. The UE 100 (controller) sets a value obtained by "timer value×UE-ID" to the timer, and starts the quality measurement of the adjacent cell at the timing at which the timer has expired.

Alternatively, the system information may include a threshold value to be compared with a random number generated by the UE 100 (controller). The UE 100 (controller) measures the quality of the adjacent cell based on a result of a comparison between the random number and the threshold value at the predetermined timing. For example, the UE 100 (controller) starts, if, at the predetermined timing, a condition such as the random number being larger than the threshold value or the random number being smaller than the threshold value is satisfied, the quality measurement of the adjacent cell.

(Mobile Communication Method)

Figure 7:
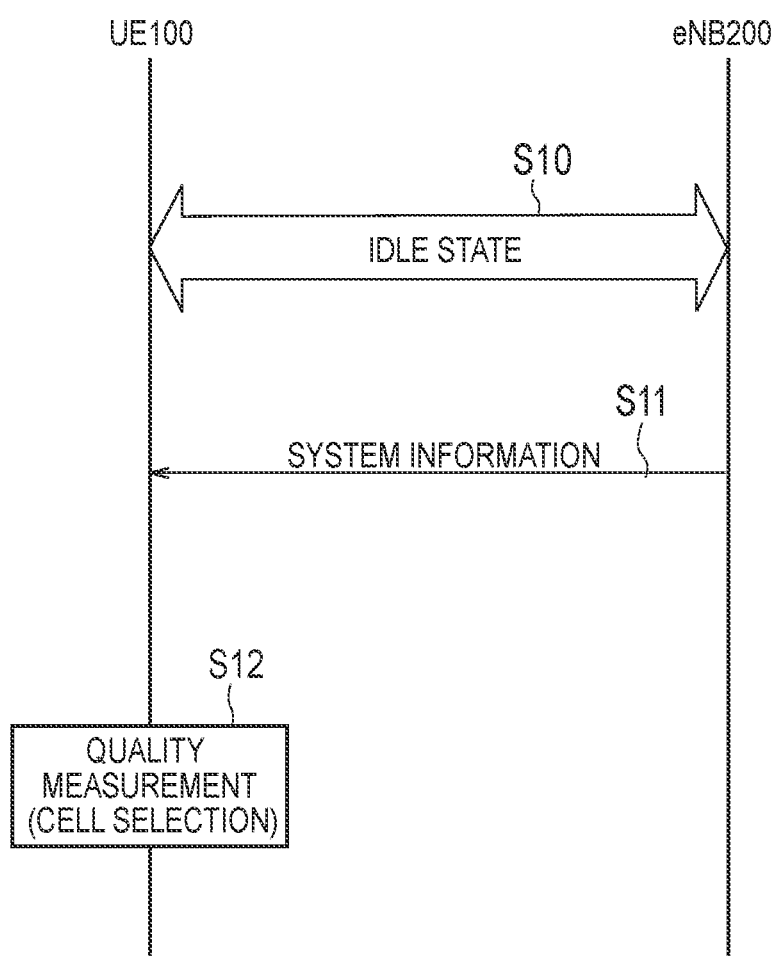
FIG. 7 is a sequence diagram illustrating a mobile communication method according to a first embodiment.

A mobile communication method according to the first embodiment will be described below. FIG. 7 is a sequence diagram illustrating the mobile communication method according to the first embodiment.

As illustrated in FIG. 7, in step S10, the UE 100 is in the RRC idle state.

In step S11, the UE 100 receives the system information (SIB; System Information Block) broadcast from the eNB 200 (the current serving cell).

In step S12, the UE 100 measures, even if the quality of the current serving cell satisfies the predetermined quality criteria, at the predetermined timing, the quality of the adjacent cell adjacent to the current serving cell. The UE 100 specifies the predetermined timing based on the system information (SIB; System Information Block).

(Operation and Effect)

The UE 100 (controller) according to the first embodiment measures, even if the quality of the current serving cell satisfies the predetermined quality criteria, at the predetermined timing, the quality of the adjacent cell adjacent to the current serving cell. That is, even for a UE 100 that is present in a geographically close location, the timing at which the quality measurement of the adjacent cell is started upon selection of the target cell is temporally discrete. Therefore, load distribution of each cell can be appropriately performed. In other words, UEs 100 in an RRC idle state can be appropriately distributed to each cell.

[First Modification]

A first modification of the first embodiment will be described, below. Differences from the first embodiment will be mainly described, below.

Specifically, in the first embodiment, the UE 100 measures, even if the quality of the current serving cell satisfies the predetermined quality criteria, at the predetermined timing, the quality of the adjacent cell adjacent to the current serving cell. On the contrary, in the first modification, the UE 100 (controller) selects, as illustrated in (B1) to (B3) described in the first embodiment, the target cell used as the serving cell from among cells having a quality that satisfies the predetermined quality criteria (S-criteria or R-criteria). In the selection of the target cell, the UE 100 (controller) uses a value having randomness to select the target cell.

The value having randomness should not be a value common to all UEs 100 that exist in the current serving cell. For example, the value having randomness is a value equal to or greater than 1 selected from the identifier (UE-ID) assigned to the UE 100, the random number generated by the UE 100 (controller), and an access class (AC) related to an access regulation of the UE 100.

Here, the UE 100 (controller) may correct, based on the value having randomness (for example, the UE-ID, the random number, the AC), the quality (for example, Squal, Srxlev, $Q_{meas,s}$, $Q_{meas,n}$). For example, as a method of correcting the quality, new values may be defined as the various types of offsets ($Q_{qualminoffset}$, $Q_{rxlevminoffset}$, $Qoffset_{temp}$, $Q_{Hyst}$, Qoffset), or a new offset may be introduced. The various types of offsets are calculated, for example, by offset=(default offset)×(UE-ID÷n). It is noted that n is a predetermined value or a value broadcast from the serving cell.

Alternatively, the UE 100 (controller) may correct, based on the value having randomness (for example, the UE-ID, the random number, the AC), the priority (cellReselectionPriority) of the frequency in which each of the plurality of cells is operated.

Alternatively, the UE 100 (controller) may select, based on the value having randomness (for example, the UE-ID, the random number, the AC), the target cell from among cells having the quality that satisfies the predetermined quality criteria (S-criteria or R-criteria). In other words, the UE 100 (controller) identifies cells having the quality that satisfies the predetermined quality criteria (S-criteria or R-criteria), and selects, based on the value having randomness, the target cell from among the identified cells (selection candidate cells). For example, the UE 100 (controller) corrects, based on the value having randomness, a ranking of the selection candidate cells.

Alternatively, the UE 100 (controller) may select, based on the value having randomness, the target cell from among cells operated at a frequency having the same priority as the frequency of the current serving cell. Here, the frequency having the same priority as the frequency of the current serving cell may be the same frequency as the frequency of the current serving cell, or may be a frequency different from the frequency of the current serving cell. In other words, the UE 100 (controller) identifies cells satisfying the above-described conditions, and selects, based on the value having randomness, the target cell from among the identified cells (selection candidate cells). For example, the UE 100 (controller) corrects, based on the value having randomness, a ranking of the selection candidate cells.

Alternatively, the UE 100 (controller) may select, based on the value having randomness, the target cell from among cells having the quality in a predetermined range. Here, the predetermined range is preferably included in the system information (SIB; System Information Block) broadcast from the current serving cell. In other words, the UE 100 (controller) may identify cells having the quality in the predetermined range, and select, based on the value having randomness, the target cell from among the identified cells (selection candidate cells). The quality in the predetermined range may be a quality in which a difference to the best quality is included in the predetermined range (for example, within 5 dB), or may be a quality of a cell having a ranking in the predetermined range (for example, the top three) counted from the top of the ranking. For example, the UE 100 (controller) corrects, based on the value having randomness, the ranking of the selection candidate cells.

It is noted that, the ranking of the cells can be corrected as follows, for example. If the random number is used as the value having randomness, the ranking of the cells is modified by using a function of Roundup {RAND×(number of selection candidate cells)}. Alternatively, if the UE-ID is used as the value having randomness, the cell with the highest ranking is selected as the target cell from among selection candidate cells satisfying the relationship of (UE ID) mod (Cell ID)≤n. It is noted that n is a predetermined value or a value broadcast from the serving cell.

(Mobile Communication Method)

Figure 8:
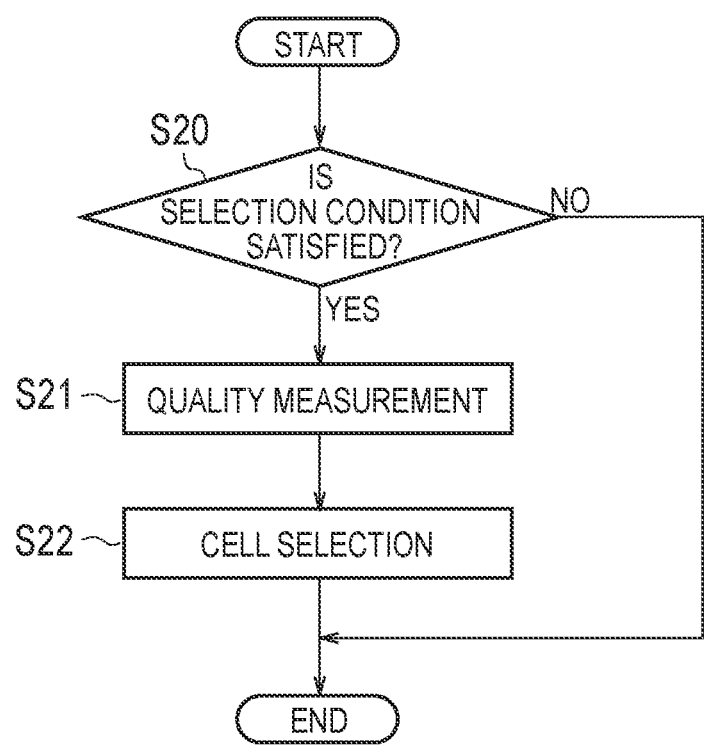
FIG. 8 is a flow diagram illustrating a mobile communication method according to a first modification.

Hereinafter, a mobile communication method according to the first modification will be described. FIG. 8 is a flow diagram illustrating the mobile communication method according to the first modification. It should be noted that the flow illustrated in FIG. 8 is performed by the UE 100.

As illustrated in FIG. 8, in step S20, the UE 100 determines whether or not a start condition to start measuring the quality of the adjacent cell adjacent to the current serving cell is satisfied. If a determination result is YES, the UE 100 performs a process of step S21. On the other hand, if the determination result is NO, the UE 100 terminates the series of processes.

It is noted that, the start condition is shown as follows, as described above:

(A1) A frequency having a higher priority than the priority of the frequency of the current serving cell the UE 100 always measures the quality of the frequency having the higher priority.

(A2) A frequency having a priority equal to or lower than the priority of the frequency of the current serving cell the UE 100 measures, if the quality of the current serving cell falls below a predetermined threshold value, the quality of the frequency having the equal priority or the lower priority.

Here, in step S20, as described above, the priority of the frequency (cellReselectionPriority) may be corrected based on the value having randomness (for example, the UE-ID, the random number, the AC).

In step S21, the UE 100 measures the quality of the adjacent cell adjacent to the current serving cell.

Here, in step S21, as described above, the quality (for example, Squal, Srxlev, $Q_{meas,s}$, $Q_{meas,n}$) may be corrected based on the value having randomness (for example, the UE-ID, the random number, the AC).

In step S22, the UE 100 selects the target cell used as the serving cell from among cells (selection candidate cells) having the quality that satisfies the predetermined quality criteria (S-criteria or R-criteria).

Here, in step S22, as described above, the ranking of the selection candidate cells may be corrected based on the value having randomness (for example, the UE-ID, the random number, the AC).

It is noted that, in the description according to FIG. 8, only a part of the first modification is illustrated, however, it should be noted that the UE 100 only needs to select the target cell by using the value having randomness, as described above.

(Operation and Effect)

The UE 100 (controller) according to the first modification selects the target cell by using the value having randomness. That is, even for the UE 100 that is present in the geographically close location, variation occurs in the cell selected as the target cell. Therefore, load distribution of each cell can be appropriately performed. In other words, UEs 100 in an RRC idle state can be appropriately distributed to each cell.

[Second Modification]

A second modification of the first embodiment will be described, below. Differences from the first embodiment will be mainly described, below.

Specifically, in the first embodiment, the UE 100 measures, even if the quality of the current serving cell satisfies the predetermined quality criteria, at the predetermined timing, the quality of the adjacent cell adjacent to the current serving cell. On the contrary, in the second modification, the UE 100 (controller) selects, as illustrated in (B1) to (B3) described in the first embodiment, the target cell used as the serving cell, from among cells having the quality that satisfies the predetermined quality criteria (S-criteria or R-criteria). The UE 100 (controller) selects the target cell based on a reselection parameter different for each group including one or more UEs 100.

Here, a group to which the UE 100 belongs is designated by a message (for example, RRC Connection Release) used in a transition procedure from the connected state to the idle state. The message (for example, RRC Connection Release) may include group identification information for identifying a group to which the UE 100 belongs.

Further, the reselection parameter includes the priority of the frequency (cellReselectionPriority), a predetermined period (Treselection$_{RAT}$), various types of offsets ($Q_{qualminoffset}$, $Q_{rxlevminoffset}$, Qoffset$_{temp}$, $Q_{Hyst}$, Qoffset), and various types of threshold values (Thresh$_{X,HighQ}$, Thresh$_{X,HighP}$, Thresh$_{serving,LowQ}$, Thresh$_{serving,LowP}$).

In the second modification, the reselection parameter is preferably included in the system information (SIB; System Information Block) broadcast from the current serving cell. That is, the cell broadcasting the reselection parameter may be different from the cell for transmitting the message (for example, RRC Connection Release). However, the reselection parameter may be included in the message (for example, RRC Connection Release).

Here, the UE 100 (controller) may maintain the group to which the UE 100 belongs until transitioning again from the RRC idle state to the RRC connected state. That is, the group to which the UE 100 belongs is released by a transition from the RRC idle state to the RRC connected state. Alternatively, the UE 100 (controller) may maintain the group to which the UE 100 belongs until a timer activated by reception of the message (for example, RRC Connection Release) expires. That is, the group to which the UE 100 belongs may be released when a timer activated by designation of the group expires.

The group including one or more UEs 100 may be formed based on one or more pieces of information selected from among a category of the UE 100 (a capacity of throughput), a capability of the UE 100 (number of streams of MIMO, and the like), a statistic according to a traffic of the UE 100 (S1 Initial UE Context Setup), a statistic according to a mobility of the UE 100 (S1 Initial UE Context Setup), and location information of the UE 100 (including measurement report).

Alternatively, the group including one or more UEs 100 may be formed by the access class (AC) related to the access regulation of the UE 100. That is, the reselection parameter differs for each access class related to the access regulation of the UE 100.

(Mobile Communication Method)

Figure 9:
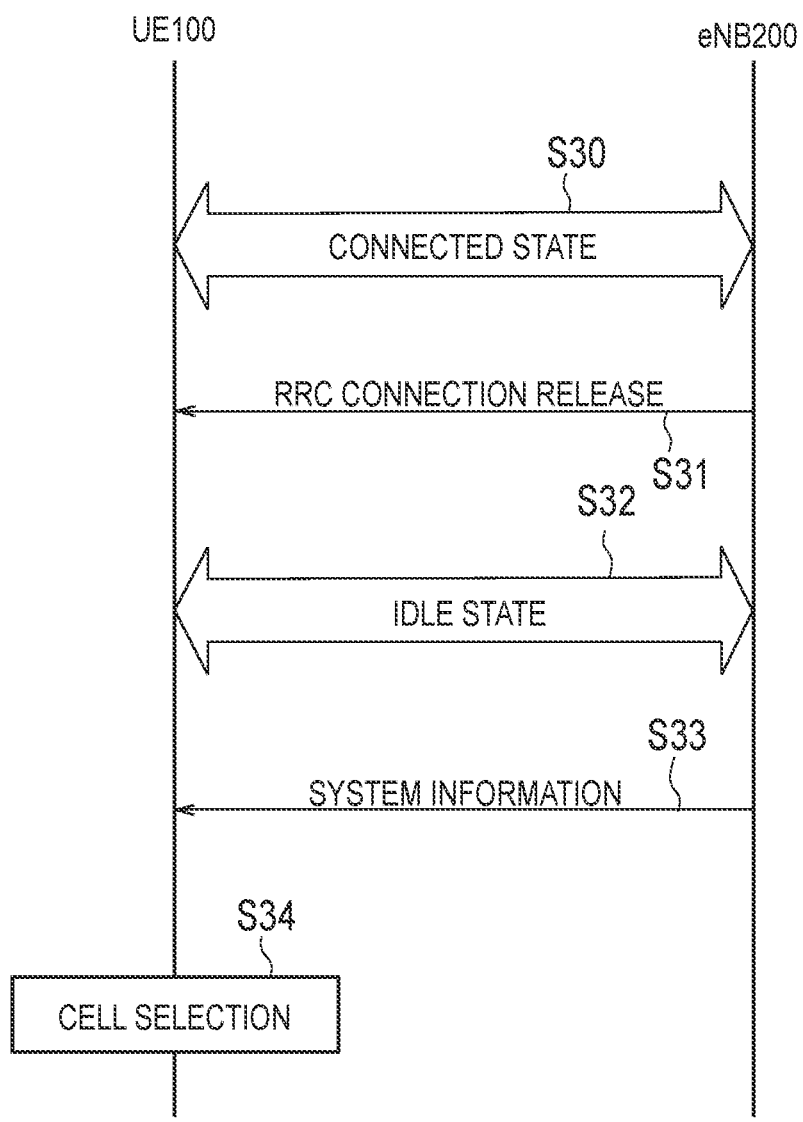
FIG. 9 is a sequence diagram illustrating a mobile communication method according to a second modification.

Hereinafter, a mobile communication method according to the second modification will be described. FIG. 9 is a sequence diagram illustrating the mobile communication method according to the second modification.

As illustrated in FIG. 9, in step S30, the UE 100 is in the RRC connected state.

In step S31, the UE 100 receives a message (RRC Connection Release) used in the transition procedure from the connected state to the idle state. The message (RRC Connection Release) designates the group to which the UE 100 belongs.

In step S32, the UE 100 is in the RRC idle state.

In step S33, the UE 100 receives the system information (SIB; System Information Block) broadcast from the eNB 200 (the current serving cell). The system information includes a reselection parameter different for each group including one or more UEs 100.

It is noted that, the cell broadcasting the reselection parameter may be different from the cell for transmitting the message (for example, RRC Connection Release).

In step S34, the UE 100 selects the target cell based on the reselection parameter assigned to the group to which the UE 100 belongs.

(Operation and Effect)

The UE 100 (controller) according to the second modification selects the target cell based on the reselection parameter different for each group including one or more UEs 100. That is, even if the UE 100 is present in the geographically close location, variation occurs in the cell to be selected as the target cell for each group. Therefore, load distribution of each cell can be appropriately performed. In other words, UEs 100 in an RRC idle state can be appropriately distributed to each cell.

[Third Modification]

A third modification of the first embodiment will be described, below. Differences from the first modification will be mainly described, below.

In the first modification, a case where the UE 100 (controller) corrects the ranking of the selection candidate cells based on the value having randomness is described as an example. On the contrary, in the third modification, another selection method will be explained as a method of selecting the target cell based on the value having randomness.

Specifically, the UE 100 (receiver) receives the system information including the threshold value to be compared with the random number generated by the controller. The UE 100 (controller) selects the target cell, based on a comparison result between the random number and the threshold value.

More particularly, the UE 100 (controller) calculates, based on measurement results of the quality of each of the plurality of cells, the ranking of each of the plurality of cells, as described above. The rankings are, as described above, the ranking Rs of the current serving cell and the ranking Rn of the adjacent cell. The UE 100 (controller) selects the target cell, based on the comparison result between the random number and the threshold value.

In such a case, the system information includes a threshold value different for each ranking. The UE 100 (controller) generates random numbers for each ranking, and selects the target cell, based on the comparison result between a random number and a threshold value for each ranking. The UE 100 (controller) may compare the random number with the threshold value in descending order according to the ranking, and select, as the target cell, a cell of which the comparison result between the random number and the threshold value satisfies the selection condition.

For example, the system information includes information associating the ranking with the threshold value (Ranking_No, Probability). Such information (Ranking_No, Probability) is information such as {Rank 1, 0.6}, {Rank 2, 0.8}, and {Rank 3, 1.0}. It is noted that, {Rank 1, 0.6} means that the threshold value associated with the Rank 1 is 0.6. Similarly, {Rank 2, 0.8} means that the threshold value associated with the Rank 2 is 0.8, and {Rank 3, 1.0} means that the threshold value associated with the Rank 3 is 1.0. Further, the range that the random number generated by the UE 100 (controller) can take is 0 to 1. Here, the selection condition that the comparison result between the random number and the threshold value should satisfy is, for example, condition that the random number is equal to or less than the threshold value.

Firstly, the UE 100 (controller) determines whether or not to select a cell in ranking 1, as the target cell. That is, the UE 100 (controller) generates the random number for the cell in the ranking 1, and determines whether or not the comparison result between the random number and 0.6 satisfies the selection condition. For example, the UE 100 (controller) determines that, if the random number is 0.8, the selection condition is not satisfied. Therefore, the UE 100 (controller) continues to select the target cell.

Secondly, the UE 100 (controller) determines whether or not to select a cell in ranking 2, as the target cell. That is, the UE 100 (controller) generates the random number for the cell in the ranking 2, and determines whether or not the comparison result between the random number and 0.8 satisfies the selection condition. For example, the UE 100 (controller) determines that, if the random number is 0.7, the selection condition is satisfied. Therefore, the UE 100 (controller) selects the cell in the ranking 2 as the target cell, and terminates the selection of the target cell.

According to the above-described method of selecting the target cell, the probability that the cell in the ranking 1 is selected as the target cell is 60%. The probability that the cell in the ranking 2 is selected as the target cell is 32% ($\{1-0.6\}\times0.8$). The probability that the cell in ranking 3 is selected as the target cell is 8% ($1-0.6-0.32$). Thus, the threshold value included in the system information may be determined so that the cell having a high ranking is easily selected as the target cell. However, the third modification is not limited thereto, and the threshold value included in the system information may be determined by the load or capability of the cell.

In the third modification, a case where the system information includes the information associating the ranking with the threshold value (Ranking_No, Probability) is described as an example. However, the third modification is not limited thereto. For example, the system information includes the information associating the priority with the threshold value (Priority, Probability).

In such a case, the UE 100 (controller) generates random numbers for each priority, and selects the target cell, based on the comparison result between a random number and a threshold value for each priority. The UE 100 (controller) may compare the random number with the threshold value in descending order according to the priority, and select, as the target cell, the cell of which the comparison result between the random number and the threshold value satisfies the selection condition.

The priority may be the priority of the frequency at which the cell is operated, or the priority peculiar to the cell.

[Fourth Modification]

A fourth modification of the first embodiment will be described, below. Differences from the first embodiment and the third modification will be mainly described.

In the fourth modification, the UE 100 (controller) triggers (or executes or starts, the same hereinafter), in response to a reference trigger notification that is any one of a plurality of trigger notifications broadcast from the current serving cell, an operation (or a procedure, the same hereinafter) for selecting (or reselecting, the same hereinafter) the target cell. The reference trigger notification is preferably any trigger notification of the plurality of trigger notifications. However, the reference trigger notification may be some trigger notification of the plurality of trigger notifications, or may be two or more trigger notifications.

Here, the trigger notification may be, at the initiative of the network (in this case, the current serving cell), a notification directly or indirectly triggering the operation in which the UE 100 selects the target cell, and a notification broadcast over a plurality of times within a constant period. In other words, the trigger notification may be a notification for instructing the UE 100 to perform the operation for selecting the target cell.

For example, the trigger notification may be the system information (SIB; System Information Block) described in the first embodiment. The system information described in the first embodiment includes information for specifying the predetermined timing at which the UE 100 starts the quality measurement of the adjacent cell. Therefore, it should be noted that the system information described in the first embodiment directly triggers the operation in which the UE 100 selects the target cell.

Alternatively, the trigger notification may be the system information (SIB; System Information Block) described in the third modification. As described above, the system information described in the third modification includes the threshold value to be compared with the random number. Alternatively, the system information described in the third modification may include the information associating the ranking with the threshold value (Ranking_No, Probability). Alternatively, the system information described in the third modification may include the information associating the priority with the threshold value (Priority, Probability). It is noted that, the UE 100 (controller) selects, in response to reception of the system information described in the third modification, the cell of which the comparison result between the random number and the threshold value satisfies the selection conditions, as the target cell. Therefore, it should be noted that the system information described in the third modification indirectly triggers the operation in which the UE 100 selects the target cell.

In such a case, each of the plurality of trigger notifications includes a counter value. The UE 100 (controller) stores, in response to trigger (or execution, the same hereinafter) of the operation for selecting the target cell, the counter value included in the reference trigger notification into a counter. For example, the UE 100 retains the counter in the memory 150. The UE 100 may accumulate, each time the operation for selecting the target cell in response to the reference trigger notification is triggered, the counter value into the counter. The UE 100 (controller) does not trigger (or prohibits execution of), if the counter value included in the trigger notification broadcast from the current serving cell coincides with the counter value stored in the counter, the operation for selecting the target cell in response to the trigger notification. On the other hand, the UE 100 (controller) triggers, if the counter value included in the trigger notification broadcast from the current serving cell does not coincide with the counter value stored in the counter, the operation for selecting the target cell. Thus, in response to any trigger notification (that is, the reference trigger notification) of the trigger notifications broadcast over the plurality of times within the constant period, the operation for selecting the target cell by the UE 100 is triggered only once. In other words, in response to each of the plurality of trigger notifications within the constant period, a situation in which the operation for selecting the target cell is triggered over a plurality of times is suppressed. In other words, the UE 100 triggers, in response to one type of the trigger notification, the operation for selecting the target cell at most once. It is noted that, the counter value may be a predetermined numerical value (0 to 9, and the like).

It is noted that, the counter value included in each of the plurality of trigger notifications is updated by the current serving cell at the timing when causing the UE 100 to attempt to trigger the operation for selecting the target cell. That is, the current serving cell broadcasts, at the timing when attempting to redistribute UEs 100 in the RRC idle state to each cell, the trigger notification including the updated counter value, over the plurality of times within the constant period.

(Operation and Effect)

Here, when the operation for selecting the target cell is triggered by the UE 100 over the plurality of times, in response to each of the plurality of trigger notifications, most of the UEs 100 existing in the current serving cell select the target cell. In other words, most of the UEs 100 selects the similar cell as the serving cell, and as a result, UEs 100 in the RRC idle state cannot be appropriately distributed to each cell.

On the contrary, in the fourth modification, the UE 100 (controller) triggers, in response to the reference trigger notification that is any one of the plurality of trigger notifications broadcast from the current serving cell, the operation for selecting the target cell. Therefore, UEs 100 in the RRC idle state can be appropriately distributed to each cell.

[Fifth Modification]

A fifth modification of the first embodiment will be described, below. Differences from the fourth modification will be mainly described, below.

In the fourth modification, the trigger notification is the system information (SIB; System Information Block) described in the first embodiment or the third modification. On the contrary, in the fifth modification, the trigger notification is a reselection request signal for requesting reselection of the target cell.

In the fifth modification, the UE 100 (receiver) receives, from the current serving cell, the reselection request signal for requesting reselection of the target cell. The UE 100 (controller) performs, in response to reception of the reselection request signal, reselection of the target cell. Here, it should be noted that the UE 100 (controller) starts, even if the start conditions indicated in the above-described (A1) and (A2) are not satisfied, the quality measurement of the adjacent cell upon reselection of the target cell.

Here, the current serving cell broadcasts, if the load of the current serving cell is equal to or greater than a predetermined load, the reselection request signal. It is preferable that the current serving cell repeatedly broadcasts the reselection request signal in a period during which the load of the current serving cell is equal to or greater than the predetermined load. In other words, the UE 100 (receiver) receives, if the load of the current serving cell is equal to or greater than the predetermined load, the reselection request signal from the current serving cell. It is preferable that the UE 100 (receiver) repeatedly receives the reselection request signal in the period during which the load of the current serving cell is equal to or greater than the predetermined load.

In the fifth modification, the reselection request signal includes a reselection parameter for making the current serving cell hard to be selected as the target cell. The UE 100 (controller) selects the target cell, based on the reselection parameter. More particularly, the reselection parameter may be a parameter that designates to change the priority of the frequency of the current serving cell (cellReselectionPriority) to the lowest priority, or an offset indicating the number of steps to lower the priority of the frequency of the current serving cell (cellReselectionPriority). Alternatively, the reselection parameter may be the various types of offsets ($Q_{qualminoffset}$, $Q_{rxlevminoffset}$, $Qoffset_{temp}$, $Q_{Hyst}$, Qoffset), and the various types of threshold values ($Thresh_{X, HighQ}$, $Thresh_{X, HighP}$, $Thresh_{serving, LowQ}$, $Thresh_{serving, LowP}$).

In the fifth modification, the reselection parameter applied in response to reception of the reselection request signal is not included in the reselection request signal, but may be included in the system information (SIB; System Information Block) broadcast separately from the reselection request signal, from the current serving cell. Alternatively, the reselection parameter applied in response to reception of the reselection request signal may be predetermined. In such a case, the UE 100 (controller) performs, in response to reception of the reselection request signal, reselection of the target cell, based on the reselection parameter broadcast from the current serving cell or the predetermined reselection parameter.

In the fifth modification, the UE 100 (controller) may maintain, if, even if the reselection request signal is received, a predetermined condition is satisfied, existence in the current serving cell without performing reselection of the target cell. The predetermined condition is a condition related to at least one of information of the class of the UE 100 (UE class), the priority of the frequency of the current serving cell, the power consumption setting of the UE 100, the time elapsed since receiving the last reselection request signal, and the value having randomness.

For example, if the class of the UE 100 (UE class) is MTC (Machine Type Communication) or a terminal dedicated to data, a communication data amount is small, and hence, the UE 100 (controller) preferably maintains the existence in the current serving cell without performing reselection of the target cell.

Alternatively, if the priority of the frequency of the current serving cell is the highest priority, there is a high possibility of receiving MBMS data or providing a D2D proximity service (D2D ProSe), and hence, the UE 100 (controller) preferably maintains the existence in the current serving cell without performing the reselection of the target cell.

Alternatively, if the power consumption setting of the UE 100 is a low power consumption setting, in order to suppress the power consumption, the UE 100 (controller) preferably maintains the existence in the current serving cell without performing reselection of the target cell.

Alternatively, if the time elapsed since receiving the last reselection request signal has not elapsed the predetermined time, in order to suppress a ping-pong phenomenon, the UE 100 (controller) preferably maintains the existence in the current serving cell without performing reselection of the target cell. For example, the UE 100 (controller) activates a timer at the timing of receiving the last reselection request signal, and preferably does not reselect the target cell until the timer expires.

Alternatively, the UE 100 (controller) suppresses a situation where the plurality of UEs 100 simultaneously reselect the target cell, and preferably maintains, if, in order to randomly distribute the UEs 100 to each cell, the value having randomness is other than the predetermined value, the existence in the current serving cell without performing reselection of the target cell. The value having randomness should not be a value common to all the UEs 100 that exist in the current serving cell. For example, the value having randomness may be a subframe number (SFN) in which the UE 100 receives the reselection request signal, an identifier (UE-ID) of the UE 100 for receiving the reselection request signal, or a random number generated by the UE 100. For example, the UE 100 (controller) performs, if SFNmodUE-ID (÷n)=0 is satisfied, reselection of the target cell, and does not perform, if SFNmodUE-ID (÷n)=0 is not satisfied, reselection of the target cell. It is noted that n is a predetermined value or a value broadcast from the serving cell.

[Sixth Modification]

A fifth modification of the first embodiment will be described, below. Differences from the first embodiment, and any one of the first modification to the fifth modification will be mainly described, below.

Specifically, in the first embodiment, and the first modification to the fifth modification, a signal such as the system information (SIB; System Information Block) is broadcast from the current serving cell to the UE 100.

On the contrary, in the sixth modification, a signal such as the system information broadcast from the current serving cell is broadcast to the UE 100, and is also notified to the adjacent cell (eNB 200) adjacent to the current serving cell (eNB 200). Alternatively, a load state of the current serving cell (eNB 200) is also notified to the adjacent cell (eNB 200) adjacent to the current serving cell (eNB 200). The signal or the load state such as the system information are exchanged, via an X2 interface connecting two or more eNBs 200, between each cell. Thus, the signal such as system information broadcast in each cell (the parameter for prompting reselection of the target cell) or the load state of each cell are shared between each cell, and hence, cooperative control of the plurality of cells can be performed.

For example, in a case where the loads of the plurality of cells adjacent to each other are all high, a phenomenon (ping-pong phenomenon) in which reselection of the target cell frequently occurs between the plurality of cells can be suppressed. More particularly, the current serving cell puts, in a case where a signal (a parameter for prompting reselection of the target cell) such as the system information is broadcast in the adjacent cell or a case where the load of the adjacent cell is higher than the threshold value, a broadcast of the signal (the parameter for prompting reselection of that target cell) such as the system information for the UE 100, on hold.

Here, the signal such as the system information may include, as described in the first embodiment, a parameter for specifying a timing (specified timing) at which the quality measurement of the adjacent cell is started. Alternatively, the signal such as the system information may include, as described in the first modification, the predetermined range referred to in selecting the target cell based on the value having randomness. Alternatively, the signal such as the system information may include, as described in the second modification, the reselection parameter different for each group including one or more UEs 100. Alternatively, the signal such as the system information may include, as described in the third modification, the threshold value to be compared with the random number generated by the controller. Alternatively, the signal such as the system information may include, as described in the fourth modification, the trigger notification to prompt reselection of the target cell. Alternatively, the signal such as the system information may include, as described in the fifth modification, the reselection request signal to prompt reselection of the target cell, and may include the reselection parameter applied in response to reception of the reselection request signal.

[Seventh Modification]

A seventh modification of the first embodiment will be described, below. Differences from the fifth modification will be mainly described, below.

Although not particularly mentioned in the fifth modification, in the seventh modification, the reselection request signal is included in a paging signal broadcast from the eNB 200 (serving cell).

Specifically, a transmitter of the eNB 200 (serving cell) broadcasts the paging signal on a different paging occasion. The eNB 200 (serving cell) broadcasts the paging signal including the reselection request signal for requesting reselection of the target cell.

Here, the paging occasion is a subframe including the paging signal. One or more paging occasions are included in a radio frame (paging frame). The paging frame (PF) is calculated by PF=SFNmodT=(TdivN)×(UE_ID mod N). It is noted that T is a DRX cycle of the UE 100, and N is represented by min (T, nB). nB is a value selected from 4T, 2T, T, T/2, T/4, T/8, T/16, and T/32. The paging occasion is defined by the relationship between Ns and i_s. i_s is represented by i_s=floor (UE_ID/N) mod Ns, and Ns is represented by max(1, nB/T).

In the seventh modification, the eNB 200 (serving cell) broadcasts, as the paging signal including the reselection request signal, a first paging signal on a first paging occasion, and broadcasts, as the paging signal not including the reselection request signal, a second paging signal on a second paging occasion different from the first paging occasion. In other words, the eNB 200 (serving cell) determines whether or not to include the reselection request signal in the paging signal, for each paging cycle, and broadcasts the paging signal including the reselection request signal or the paging signal not including the reselection request signal, for each paging cycle.

On the other hand, the UE 100 (receiver) receives the paging signal broadcast from the current serving cell. It should be noted that the UE 100 receives the paging signal at a paging cycle allocated to the terminal of the UE 100. The UE 100 (controller) performs, in response to the reselection request signal included in the paging signal, reselection of the target cell. It should be noted that the UE 100 starts, similarly to the fifth modification, even if the start conditions indicated in the above-described (A1) and (A2) are not satisfied, the quality measurement of the adjacent cell upon reselection of the target cell.

In the seventh modification, the UE 100 preferably performs, even if the paging signal received at the paging cycle assigned to the terminal of the UE 100 is not the paging signal addressed to the terminal of the UE 100, reselection of the target cell in response to the reselection request signal included in the paging signal.

(Operation and Effect)

In the seventh modification, the UE 100 performs, in response to the reselection request signal included in the paging signal, reselection of the target cell. That is, by the trigger on the network (current serving cell) side, reselection of the target cell is prompted to the UE 100 in the RRC idle state. Therefore, load distribution of each cell can be appropriately performed. In other words, UEs 100 in an RRC idle state can be appropriately distributed to each cell.

Here, the paging cycle differs for each UE 100, and hence, randomness of the UE 100 performing reselection of the target cell in response to the reselection request signal included in the paging signal is secured, and UEs 100 in the RRC idle state can be appropriately distributed to each cell.

In the seventh modification, the eNB 200 (serving cell) determines whether or not to include the reselection request signal in the paging signal, for each paging cycle, and broadcasts a paging signal including the reselection request signal or a paging signal not including the reselection request signal, for each paging cycle. Therefore, the percentage of UEs 100 configured to reselect the target cell in response to the reselection request signal included in the paging signal can be controlled on the eNB 200 (serving cell) side, to some extent. For example, by determining, in response to the load of the eNB 200 (serving cell), the percentage of UEs 100 configured to reselect the target cell, load distribution of each cell can be appropriately performed.

[Eighth Modification]

An eighth modification of the first embodiment will be described, below. Differences from the first modification will be mainly described, below.

Specifically, in the first modification, a case where the UE 100 (controller) corrects, based on the value having randomness (for example, the UE-ID, the random number, the AC), the quality (for example, Squal, Srxlev, $Q_{meas,s}$, $Q_{meas,n}$) is described as an example. In such a case, the various types of offsets ($Q_{qualminoffset}$, $Q_{rxlevminoffset}$, Qoffset$_{temp}$, $Q_{Hyst}$, Qoffset) are calculated by, for example, offset=(default offset)×(UE-ID÷n).

On the contrary, in the eighth modification, the UE 100 (controller) corrects, based on the value having randomness (for example, the UE-ID, the random number, the AC), the various types of threshold values (Thresh$_{X,HighQ}$, Thresh$_{X,HighP}$, Thresh$_{serving,LowQ}$, Thresh$_{serving,LowP}$). The various types of threshold values are, as described above, an example of the various types of parameters used for selecting the target cell. The various types of threshold values are calculated, for example, by threshold=(default threshold)× (UE-ID÷n). It is noted that n is a predetermined value or a value broadcast from the serving cell.

[Ninth Modification]

A ninth modification of the first embodiment will be described, below. Differences from the fifth modification will be mainly described, below.

In the fifth modification, the UE 100 (controller) performs, in response to the reception of the reselection request signal, the reselection of the target cell. The UE 100 selects the target cell, based on the reselection parameter included in the reselection request signal. In contrast, in the ninth modification, the UE 100 (controller) performs, in response to a trigger without dependence on the reselection request signal, a first reselection process, and performs, in response to the reception of the reselection request signal, a second reselection process different from the first reselection process.

Here, the first reselection process is a process of measuring the quality of an adjacent cell adjacent to the current serving cell if either one of the above-described start conditions (A1) to (A2) is satisfied, and selecting the target cell if any one of the above-described selection conditions (B1) to (B3) is satisfied. In contrast, the second reselection process is a process to which rules different from those of the first reselection process are applied in the reselection of the target cell. The rules to be applied to the second reselection process are as follows.

(Rule 1)

According to rule 1 to be applied to the second reselection process, the UE 100 does not use the priority of the frequency (cellReselectionPriority) set beforehand.

For example, in place of the priority of the frequency set beforehand, the UE 100 uses the same priority for the priority of each cell or frequency. In such a case, only the above-described (A2) may be used as the start condition. Moreover, only the above-described (B2) may be used as the selection condition.

Alternatively, the UE 100 may ignore the priority of the frequency (cellReselectionPriority) set beforehand. In such a case, only either one of the above-described (A1) and (A2) may be used as the start condition. Only one of the above-described (B1) to (B3) may be used as the selection condition.

It is noted that the above-described (B2) is a process of reselecting the target cell, based on the ranking Rs of the current serving cell and the ranking Rn of the adjacent cell (ranking process). That is, it should be noted that in a case in which only (B2) is used, the ranking process is performed for all cells in response to the reception of the reselection request signal. Alternatively, it should be noted that the ranking process is performed for a cell having a quality equal to or higher than a fixed quality in response to the reception of the reselection request signal.

(Rule 2)

According to rule 2 to be applied to the second reselection process, the UE 100 starts, in response to the reception of the reselection request signal, measurement of the quality of the frequency to be measured included in the broadcast information broadcast from the current serving cell. The broadcast information may be, for example, SIB 4 designating a frequency to be measured of an Intra-frequency, or may be SIB 5 designating a frequency to be measured of an Inter-frequency.

Here, in the first selection process, the UE 100 starts measurement of the Intra-frequency if the cell selection quality level (Squal or Srxlev) of the current serving cell is smaller than a threshold value ($S_{IntraSearchP}$ or $S_{IntraSearchQ}$). Similarly, the UE 100 starts measurement of the Inter-frequency if the cell selection quality level (Squal or Srxlev) of the current serving cell is smaller than a threshold value ($S_{InterSearchP}$ or $S_{InterSearchQ}$). Under such a premise, the UE 100 may ignore the setting of the threshold value ($S_{IntraSearchP}$ or $S_{IntraSearchQ}$), and start, in response to the reception of the reselection request signal, the measurement of the Intra-frequency. Alternatively, the UE 100 may ignore the threshold value ($S_{InterSearchP}$ or $S_{InterSearchQ}$), and start, in response to the reception of the reselection request signal, the measurement of the Inter-frequency. Alternatively, the UE 100 may handle the cell selection quality level (Squal or Srxlev) as the minimum value, and start, in response to the reception of the reselection request signal, the measurement of the quality of the frequency to be measured.

(Rule 3)

Rule 3 to be applied to the second reselection process is a rule for selecting the target cell in the ranking process. According to the rule to be applied to the first process, a cell with the highest ranking, or a cell with a higher ranking than the current serving cell is selected as the target cell. In contrast, according to rule 3 to be applied to the second reselection process, the process described below is performed.

For example, in the selection of the target cell, the UE 100 selects the target cell by using the value having randomness. For example, the UE 100 identifies cells having a quality that satisfies the predetermined quality criteria (S-criteria or R-criteria), and selects, based on the value having randomness, the target cell from among the identified cells (selection candidate cells). In such a case, the UE 100 corrects the ranking of the selection candidate cells, based on the value having randomness. It is noted that the value having randomness is, for example, the UE-ID, the random number, or the AC.

Alternatively, the UE 100 may select a cell that does not have the highest ranking as the target cell, or the UE 10 may select a cell that does not have a higher ranking than the current serving cell as the target cell.

Alternatively, in the ranking process, the UE 100 may determine the ranking of the current serving cell or the adjacent cell, based on a quality (such as the RSRQ or SINR) other than the RSRP. Such a rule may be considered as an extension of the above-described "R-criteria".

(Rule 4)

According to rule 4 to be applied to the second reselection process, the UE 100 does not use a time threshold value related to the reselection of the target cell. Specifically, the time threshold value is a predetermined period (Treselection$_{RAT}$) to be compared with a time when the cell selection quality level (Squal or Srxlev) of the adjacent cell continuously satisfies a predetermined condition, or a prohibition time threshold value (for example, one second) to be compared with a time that has elapsed since existence in the current serving cell. That is, in the second reselection process, the UE 100 handles the predetermined period (Treselection$_{RAT}$) or the prohibition time threshold value (for example, one second) as zero. Alternatively, the UE 100 ignores the predetermined period (Treselection$_{RAT}$) or the prohibition time threshold value (for example, one second).

(Rule 5)

According to rule 5 to be applied to the second reselection process, a period during which the second reselection process is applied continues over a constant period.

For example, the second reselection process is applied since the first cell is selected as the target cell by the second reselection process until the second cell is selected as the target cell by the second reselection process.

Alternatively, the second reselection process is applied in a period during which the timer is running. The timer may be activated in response to the reception of the reselection request signal, or may be activated in response to the selection of the target cell in the second reselection process. The timer activation time may be broadcast from the current serving cell, or may be included in the reselection request signal.

Alternatively, the second reselection process may be applied until reception of a message for canceling the second reselection process (for example, Reselection Request Cancel).

[Tenth Modification]

A tenth modification of the first embodiment will be described, below. Differences from the first embodiment will be mainly described, below.

The first embodiment does not particularly mention about the frequency to be measured or to be selected (hereinafter, "measurement target frequency"), in the reselection process of the cell. The measurement target frequency is, generally, included in the broadcast information broadcast from the current serving cell. The broadcast information may be, for example, SIB 4 designating the frequency to be measured of the Intra-frequency, or may be SIB 5 designating the frequency to be measured of the Inter-frequency. In contrast, in the tenth modification, a method of narrowing down a measurement target frequency in a process for appropriately distributing UEs 100 in the RRC idle state to each cell (hereinafter, "UE distribution process") will be described. The method of narrowing down the measurement target frequency is, for example, as follows.

(First Method)

In a first method, the measurement target frequency is narrowed down to a frequency having the same priority as the priority of the frequency (cellReselectionPriority) of the current serving cell.

(Second Method)

In a second method, in addition to an existing priority (first priority), an extended priority (second priority) is introduced as the priority of the frequency. The measurement target frequency is narrowed down to a frequency having the same existing priority as the existing priority of the frequency of the current serving cell, and having the same extended priority as the extended priority of the frequency of the current serving cell.

(Third Method)

In a third method, similarly to the second method, in addition to the existing priority (first priority), the extended priority (second priority) is introduced as the priority of the frequency. The measurement target frequency is narrowed down to a frequency to which the extended priority is set, without dependence on the existing priority.

(Fourth Method)

In a fourth method, similarly to the second method, in addition to an existing priority (first priority), an extended priority (second priority) is introduced as the priority of the frequency. The measurement target frequency is narrowed down to a frequency having the same extended priority as the extended priority of the frequency of the current serving cell, without dependence on the existing priority.

(Fifth Method)

In a fifth method, if a frequency having a higher priority than the priority of the frequency narrowed down by the first method through the fourth method is detected, the process of selecting the target cell (that is, the first reselection process described in the ninth modification) may be applied if any one of the above-described selection conditions (B1) to (B3) is satisfied.

In the tenth modification, the method of narrowing down the measurement target frequency in the UE distribution process is described. Here, the UE distribution process may be any of the methods indicated in the first embodiment to the ninth modification. For example, as described in the first, third, and eighth modifications, the UE distribution process may be a process of selecting the target cell by using the value having randomness. Alternatively, as described in the second modification, the UE distribution process may be a process of selecting the target cell by using a different reselection parameter for each group. As described in the fourth, fifth, seventh, and ninth modifications, the UE distribution process may be a process of selecting the target cell in response to the trigger notification (for example, the reselection request signal).

[Eleventh Modification]

An eleventh modification of the first embodiment will be described, below. Differences from the fifth modification will be mainly described, below.

In the fifth modification, the UE 100 (receiver) receives, from the current serving cell, the reselection request signal for requesting the reselection of the target cell. The UE 100 (controller) performs, in response to reception of the reselection request signal, reselection of the target cell.

In contrast, in the eleventh modification, if the UE 100 (controller) receives the reselection request signal and a predetermined trigger condition is satisfied, the UE 100 may perform the reselection of the target cell. That is, even if receiving the reselection request signal, the UE 100 (controller) may not perform the reselection of the target cell if the predetermined trigger condition is not satisfied.

In the eleventh modification, the predetermined trigger condition is a condition that the priority of the frequency (cellReselectionPriority) of the current serving cell is not a high priority.

For example, if the current serving cell is a CSG (Closed Subscriber Group) cell, the priority of the frequency of the CSG cell is set to high priority. In such a case, the predetermined trigger condition is that the current serving cell is not a CSG cell. Therefore, if the UE 100 receives the reselection request signal, and the current serving cell is not a CSG cell, the UE 100 reselects the target cell. On the other hand, even if receiving the reselection request signal, the UE 100 does not perform the reselection of the target cell if the current serving cell is a CSG cell. However, if a CSG cell is included in an adjacent cell of the current serving cell, the UE 100 may reselect the target cell even if the current serving cell is a CSG cell.

Alternatively, if the D2D proximity service (D2D ProSe) is set in the frequency of the current serving cell, the priority of the current serving cell is set to high priority. In such a case, the predetermined trigger condition is that the D2D proximity service is not set in the frequency of the current serving cell, or that the D2D proximity service can be set even though the UE 100 does not exist in the current serving cell. Therefore, the UE 100 reselects the target cell if receiving the reselection request signal in a case where the D2D proximity service is not set in the frequency of the current serving cell, or in a case where the D2D proximity service can be set even though the UE 100 does not exist in the current serving cell. On the other hand, even if receiving the reselection request signal, the UE 100 does not reselect the target cell if the D2D proximity service is set in the frequency of the current serving cell, and if the D2D proximity service cannot be set unless the UE 100 exists in the current serving cell. It is noted that whether or not the D2D proximity service can be set is influenced not only by the network (such as the eNB 200) settings, but also by the capability of the UE 100.

Alternatively, if the UE 100 has an interest in an MBMS service provided in the frequency of the current serving cell, the priority of the current serving cell is set to high priority. In such a case, the predetermined trigger condition is that the UE 100 does not have an interest in the MBMS service provided in the frequency of the current serving cell, or that an MBMS service in which the UE 100 has an interest is provided in the frequency of an adjacent cell of the current serving cell. Therefore, the UE 100 reselects the target cell if the UE 100 receives the reselection request signal in a case where the UE 100 does not have an interest in the MBMS service provided in the frequency of the current serving cell, or in a case where the MBMS service in which the UE 100 has an interest is provided in the frequency of the adjacent cell of the current serving cell. On the other hand, even if receiving the reselection request signal, the UE 100 does not reselect the target cell if the UE 100 has an interest in the MBMS service provided in the frequency of the current serving cell, and if the MBMS service in which the UE 100 has an interest is not provided in the frequency of the adjacent cell of the current serving cell.

[Twelfth Modification]

A twelfth modification of the first embodiment will be described, below. Differences from the fifth modification will be mainly described, below.

In the fifth modification, a case in which the reselection parameter is a parameter for designating to change the priority of the frequency (cellReselectionPriority) of the current serving cell to the lowest priority is described as an example. In contrast, in the twelfth modification, the definition of the lowest priority will be clarified.

Specifically, the lowest priority may be a priority that is lower than the lowest priority from among priorities that can be set at the network (eNB 200) side.

Alternatively, the lowest priority may be a lower priority than the lowest priority of priorities (cellReselectionPriorities) included in the broadcast information (such as SIB5) broadcast from the adjacent cell of the current serving cell, and included in the broadcast information received by the UE 100. That is, the lowest priority may be a lower priority than the lowest priority of priorities of the adjacent cell.

Here, as already described in the fifth modification, the UE 100 may replace the priority (cellReselectionPriority) included in broadcast information (SIB 3) broadcast from the current serving cell with the lowest priority.

It is noted that if the priority (cellReselectionPriority) can be in the range of 0 to 7, and a large value represents a high priority, the lowest priority may be a negative value.

In addition, the reselection request signal may include an identifier indicating whether or not to replace the priority of the frequency (cellReselectionPriority) of the current serving cell with the lowest priority. For example, if the current serving cell provides an MBMS service, the current serving cell transmits a reselection request signal including an identifier indicating that the priority of the frequency of the current serving cell is replaced with the lowest priority. On the other hand, if the current serving cell does not provide an MBMS service, the current serving cell transmits a reselection request signal including an identifier indicating that the priority of the frequency of the current serving cell is not replaced with the lowest priority.

[Thirteenth Modification]

A thirteenth modification of the first embodiment will be described, below. Differences from the fifth modification will be mainly described, below.

In the fifth modification, the UE 100 (receiver) receives, from the current serving cell, the reselection request signal for requesting the reselection of the target cell. The UE 100 (controller) performs, in response to reception of the reselection request signal, reselection of the target cell.

In contrast, in the thirteenth modification, after performing reselection of the target cell in response to the reception of the reselection request signal (hereinafter, "one-shot reselection"), the UE 100 (controller) may further reselect the target cell (hereinafter, "post-reselection"). Here, as described in the fifth and twelfth modifications, in the one-shot reselection, after replacing the priority of the current serving cell (or the frequency of the current serving cell) with the lowest priority, the UE 100 selects an adjacent cell (or an adjacent cell with the frequency) having a higher priority than the lowest priority as the target cell.

Here, a case in which two or more adjacent cells (or adjacent cells with the frequency) having a higher priority than the lowest priority are found in the one-shot reselection is assumed. In such a case, by performing the post-reselection after the one-shot reselection, the UE 100 can reselect an optimum cell as the target cell.

The UE 100 may perform the post-reselection only if the priority of the adjacent cell (or the frequency of the adjacent cell) is the same as the priority of the current serving cell. That is, the UE 100 may perform the post-reselection if there is an adjacent cell (or an adjacent cell with the frequency) having the same priority as the priority of the cell (or the frequency of the cell) selected as the target cell in the one-shot reselection. Alternatively, the UE 100 may perform the post-reselection if two or more adjacent cells having the same priority are found as the target cell in the one-shot reselection. On the other hand, the UE 100 may skip the post-reselection if there is no adjacent cell (or an adjacent cell with the frequency) having the same priority as the priority of the cell (or the frequency of the cell) selected as the target cell in the one-shot reselection is absent. Alternatively, the UE 100 may perform the post-reselection if two or more adjacent cells having the same priority are not found as the target cell in the one-shot reselection. Here, the post selection process may be started by implementing the measurement of the adjacent cell (or the frequency of the adjacent cell) having the same priority.

To put these expressions in different wording, the process described in (A2) in the first embodiment, that is, the process of starting the measurement of the frequency having a priority that is equal to or lower than the priority of the frequency of the current serving cell if the quality of the current serving cell (for example, Srxlev and Squal) falls below a predetermined threshold value ($S_{nonIntraSearchP}$ and $S_{nonIntraSearchQ}$) is corrected as follows. Specifically, the UE 100 starts the measurement of the frequency having the priority that is equal to or lower than the priority of the frequency of the current serving cell if the quality of the current serving cell (for example, Srxlev and Squal) falls below the predetermined threshold value ($S_{nonIntraSearchP}$ and $S_{nonIntraSearchQ}$), or if the current serving cell is a cell selected in the one-shot reselection. On the other hand, the UE 100 may not start the measurement of the frequency having the priority that is equal to or lower than the priority of the frequency of the current serving cell if the quality of the current serving cell (for example, Srxlev and Squal) exceeds the predetermined threshold value ($S_{nonIntraSearchP}$ and $S_{nonIntraSearchQ}$), and if the current serving cell is not the cell selected in the one-shot reselection. That is, the post-reselection process may be skipped in such a case.

It is noted that the priority of the cell (or of the frequency of the cell) is included in the broadcast information (such as SIB 3 or SIB 5) broadcast from each cell, and the UE 100 may grasp the priority, based on the broadcast information.

In the thirteenth modification, only one post-reselection may be executed after the one-shot reselection. That is, two or more post-reselections may not be performed after the one-shot reselection.

In the thirteenth modification, the UE 100 has a timer that activates in response to execution of the one-shot reselection, and the UE 100 may perform the post-reselection during a period until a timer value reaches a threshold value. The threshold value to be compared with the timer value may be included in the broadcast information (the SIB or the paging signal) broadcast from the current serving cell. The threshold value to be compared with the timer value may be included in the above-described reselection request signal. It is noted that only one post-reselection may be executed during the period until the timer value reaches the threshold value. That is, two or more post-reselections may not be performed during the period until the timer value reaches the threshold value. Alternatively, the UE 100 has a timer that activates in response to the execution of the post-reselection, and the UE 100 may not execute the next post-reselection during a period until a timer value reaches a threshold value, and may execute the next post reselection if the timer value reaches the threshold value. If the next post-reselection is executed upon the timer value reaching the threshold value, the UE 100 may reset or reactivate the timer. However, even during the period until the timer value reaches the threshold value, the UE 100 may execute the quality measurement described in the first embodiment above (for example, (A1) to (A2)) and the cell reselection process (for example, (B1) to (B3)). For example, even during the period until the timer value reaches the threshold value, the UE 100 may execute quality measurement of the adjacent cell (or the frequency of the adjacent cell), as well as the cell reselection process if the quality of the current serving cell (for example, Srxlev and Squal) falls below the predetermined threshold value ($S_{nonIntraSearchP}$ and $S_{nonIntraSearchQ}$).

In the one-shot reselection according to the thirteenth modification, similarly to the fifth modification or the twelfth modification, the priority (cellReselectionPriority) included in the broadcast information (the SIB 3) broadcast from the current serving cell may be replaced with the lowest priority. In such a case, in the post-reselection, the UE 100 may still handle the priority of the cell (or the frequency of the cell) (cellReselectionPriority) for which the one-shot reselection request is performed as the lowest priority. As a result, even if the network has an inadequate setting, etc., a ping-pong phenomenon in which the cell for which the one-shot reselection will be performed is selected as the target cell is suppressed.

[Fourteenth Modification]

A fourteenth modification of the first embodiment will be described, below. Differences from the fifth modification will be mainly described, below.

In the fourteenth modification, if performing a process of prompting the UE 100 to reselect the target cell by transmission of the reselection request signal (hereinafter, "UE distribution process"), the eNB 200 (cell) may notify an adjacent eNB of a message including an indication that the UE distribution process is to be performed, via the X2 interface. The timing of notifying the message including an indication that the UE distribution process is being performed may be before performing the UE distribution process, during the course of performing the UE distribution process, or after performing the UE distribution process. Here, during the course of performing the UE distribution process is a period from a timing of transmitting the first reselection request signal until a timing of transmitting the last reselection request signal in repeatedly transmitting the reselection request signal. In such a case, before performing the UE distribution process may be before the timing of transmitting the first reselection request signal. After performing the UE distribution process may be after the timing of transmitting the last reselection request signal.

In addition, if the eNB 200 ends the UE distribution process after notifying the adjacent eNB of the message including the indication that the UE distribution process is to be performed, via the X2 interface, the eNB 200 may notify the adjacent eNB of a message including an indication that the UE distribution process has ended, via the X2 interface.

Firstly, the adjacent eNB notified that the UE distribution process is to be performed, performs a process of preventing the eNB 200 (cell) that has notified that the UE distribution process is to be performed, from being selected as the target cell (hereinafter, "reselection restriction process").

For example, the adjacent eNB notified that the UE distribution process is to be performed, may set the priority of the eNB 200 (cell) that has notified that the UE distribution process is to be performed lower than the priority of the cell managed by the adjacent eNB. The adjacent eNB may broadcast the newly set priority of the eNB 200 (cell).

Alternatively, the adjacent eNB notified that the UE distribution process is to be performed, may add the eNB 200 (cell) that has notified that the UE distribution process is to be performed to a list of cells (hereinafter, "black list") that are not to be selected as the target cell. The adjacent eNB may broadcast the black list to which the eNB 200 (cell) has been added.

Secondly, the adjacent eNB notified that the UE distribution process is to be performed, performs a process of restricting a handover to the eNB 200 (cell) that has notified that the UE distribution process is to be performed (hereinafter, "handover restriction process").

For example, the adjacent eNB notified that the UE distribution process is to be performed, may exclude the eNB 200 (cell) that has notified that the UE distribution process is to be performed from a measurement target (Measurement Configuration).

Alternatively, the adjacent eNB notified that the UE distribution process is to be performed, may restrict transmission of a handover request to the eNB 200 (cell) that has notified that the UE distribution process is to be performed. Alternatively, the adjacent eNB notified that the UE distribution process is to be performed, may restrict transmission of an addition request of an SeNB in Dual Connectivity, to the eNB 200 (cell) that has notified that the UE distribution process is to be performed. Alternatively, the adjacent eNB notified that the UE distribution process is to be performed is notified, may transmit a message about exclusion from an SeNB in Dual Connectivity, to the eNB 200 (cell) that has notified that the UE distribution process is to be performed.

Here, if the adjacent eNB activates in response to start of the reselection restriction process or the handover restriction process, and the timer value reaches the threshold value, the adjacent eNB may cancel the reselection restriction process or the handover restriction process. The threshold value to be compared with the timer value may be set beforehand, or may be included in the message indicating that the UE distribution process is to be performed, or may be notified from an OAM (Operation, Administration, and Management) server. Alternatively, the adjacent eNB may cancel the reselection restriction process or the handover restriction process if being notified that the UE distribution process has ended.

[Other Modifications]

Although not particularly mentioned in the first embodiment, the quality measurement of the adjacent cell upon selection of the target cell may be started if the predetermined condition is satisfied at the predetermined timing (first embodiment). Alternatively, selection of the target cell by using the value having randomness (first modification) may be performed if the predetermined condition is satisfied. For example, the predetermined condition may be that the access class of the UE 100 is the access class notified from the current serving cell. Alternatively, the predetermined condition may be that the priority of the frequency modAC=0 is satisfied, or that cell–IDmodAC=0 is satisfied.

As described in the first embodiment, a selection procedure of the target cell as a whole includes, (A) if the start conditions are satisfied, a procedure for measuring the quality of the adjacent cell adjacent to the current serving cell (measurement procedure), and (B) a procedure for selecting, from among cells that satisfy the selection conditions, the target cell to be used as the serving cell (selection procedure). The first embodiment relates to the measurement procedure, and the first modification to the third modification relate to the selection procedure. In such a case, the measurement procedure according to the first embodiment may be combined with the selection procedure according to any one of the first modification to the third modification. Further, the selection procedure according to two or more modifications selected from the first modification to the third modification may be combined.

In the fourth modification, a case where the current serving cell uses, in order to cause the UE 100 to trigger the operation for selecting the target cell in response to the reference trigger notification which is any one of the plurality of trigger notifications, the counter that the UE 100 has and the counter value included in the trigger notification is described as an example. However, the fourth modification is not limited thereto. Specifically, in response to the trigger notification (reference trigger notification) of any one of the trigger notifications broadcast, from the current serving cell, over the plurality of times within the constant period, the operation in which the UE 100 selects the target cell may be triggered. Therefore, the UE 100 may activate the timer in response to trigger (or execution or start, the same hereinafter) of the operation for selecting the target cell, and be configured, even if the trigger notification is received until the timer expires, not to trigger the operation for selecting the target cell. The time until the timer expires since the timer has been activated is preferably comparable to the period (the above-described constant period) during which the trigger notification is broadcast over the plurality of times. Alternatively, each of the plurality of trigger notifications includes toggle information that can take a value of two or more, and the UE 100 (controller) may store, if, in response to the reference notification, the operation for selecting the target cell is triggered, the toggle information included in the reference trigger, in a storage area. In such a case, the UE 100 (controller) does not trigger, if the toggle information included in the trigger notification broadcast from the current serving cell coincides with the toggle information stored in the storage area, the operation for selecting the target cell. On the other hand, the UE 100 (controller) triggers, if the toggle information included in the trigger notification broadcast from the current serving cell does not coincide with the toggle information stored in the storage area, the operation for selecting the target cell.

Although not particularly mentioned in the first embodiment, a cell (hereinafter, an overload cell) that transmits the trigger notification such as the parameter for prompting reselection of the target cell or the reselection request signal for requesting reselection of the target cell may be handled as follows. Specifically, the UE 100 may exclude the overload cell from cells to be measured. Alternatively, the UE 100 may exclude, even if the overload cell satisfies the criteria ("S-criteria") to be satisfied by the adjacent cell, the overload cell from cells to be used as the serving cell. Alternatively, the UE 100 may exclude the overload cell from cells imparting the ranking. Thus, in a state where the plurality of adjacent cells are transmitting the trigger notification (for example, in a state where each of the plurality of the adjacent cells is high in load), the ping-pong phenomenon in which the UE 100 alternately selects these adjacent cells as the target cell is suppressed.

Although not particularly mentioned in the first embodiment, the UE 100 may perform, if the condition that the time elapsed since the UE 100 existed in the current serving cell exceeds the prohibition time threshold value (for example, one second) is satisfied, reselection of the target cell. Under such a premise, if the UE 100 reselects the target cell in response to the above-described trigger notification, it is preferable to use a time threshold value longer than the time threshold value used in a case of performing reselection of the target cell in response to the above-described start conditions (A1 and A2). Thus, in a state where the plurality of adjacent cells are transmitting the trigger notification (for example, in a state where each of the plurality of the adjacent cells is high in load), the ping-pong phenomenon in which the UE 100 alternately selects these adjacent cells as the target cell is suppressed. From a similar point of view, if the UE 100 reselects the target cell in response to the above-described trigger notification, it is preferable to use the predetermined period (Treselection$_{RAT}$) longer than the predetermined period (Treselection$_{RAT}$) used in the case of performing reselection of the target cell in response to the above-described start conditions (A1 and A2).

In the first embodiment and the modifications thereof, the priority (cellReselectionPriority) may be considered as the priority assigned to the frequency of the cell, or may be considered as the priority assigned to the cell. For example, the priority (cellReselectionPriority) may be the priority of an inter-frequency, or may be the priority of an inter-RAT frequency cell. It is noted that a content of a process based on the priority assigned to the cell (Cell specific priority) will be explained as follows.

[Cell Specific Prioritization (CSP)]

In the mobile communication system, the priority assigned to each cell (Cell specific priority) (hereinafter referred to as "CSP") is used in a predetermined process. The CSP is used, for example, if the UE 100 in the idle state reselects the cell. The CSP defines the priority of the cell for the cell reselection and/or a measurement of a radio signal according to the cell reselection (hereinafter referred to as "cell reselection process"). The CSP may be defined based on a parameter indicating an operation state of the eNB 200 (cell) (such as the load state in the cell), a type of the cell, and the like.

[Paging-Triggered Cell Specific Prioritization]

In the mobile communication system applying the CSP, a process indicated in each of the following embodiments may be performed.

Second Embodiment

Figure 10:
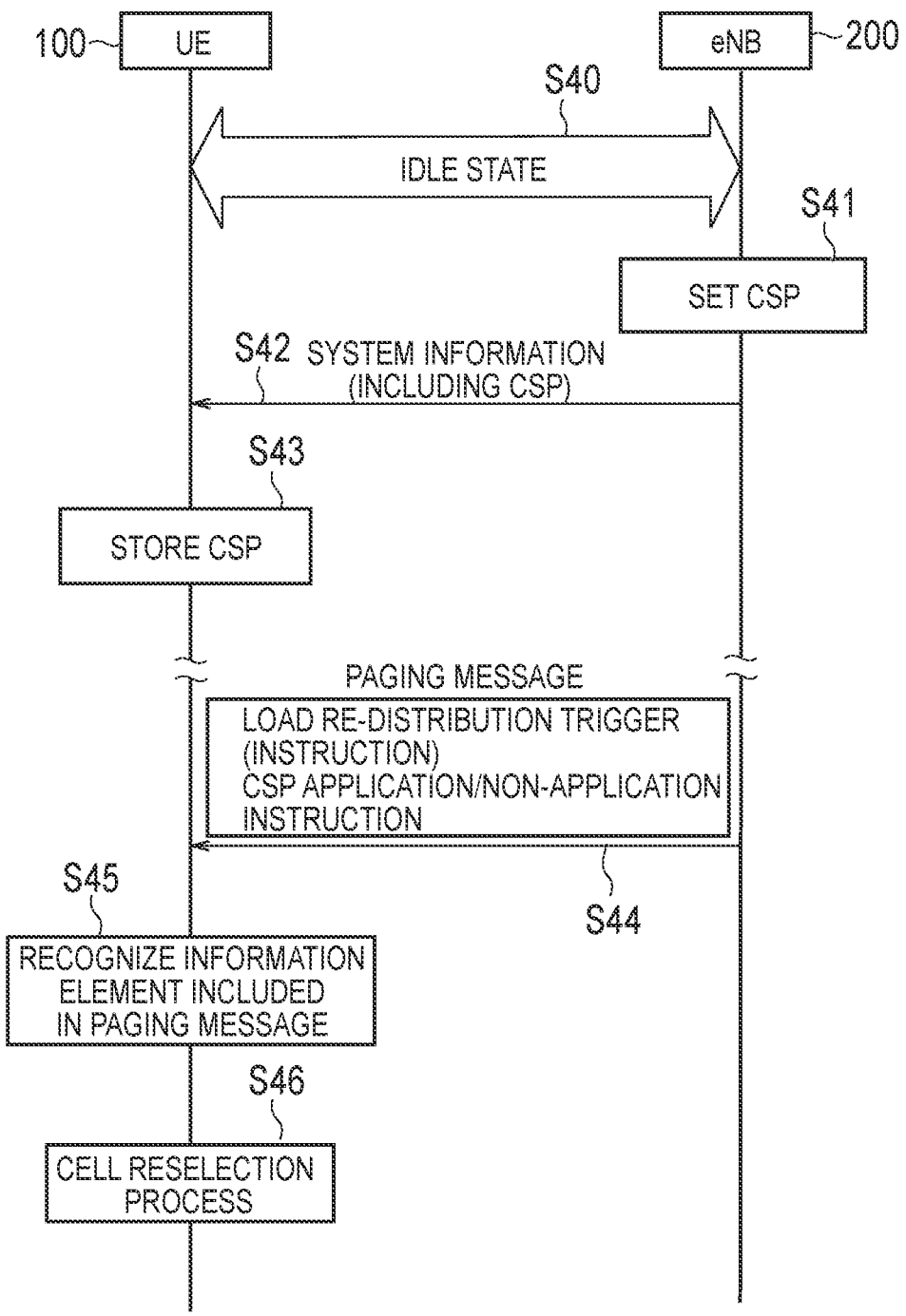
FIG. 10 is a diagram illustrating a process flow of a second embodiment.

FIG. 10 is a diagram illustrating a process flow of a second embodiment. In FIG. 10, the UE 100 camps, in an idle state, on a cell (serving cell) managed by the eNB 200 (step S40). The eNB 200 (or an entity of the network side) sets, at a predetermined condition and timing, CSPs of a plurality of cells to be applied in the eNB 200 (step S41). The CSPs of the plurality of cells includes a CSP of the cell managed by the eNB 200 and/or a CSP of the adjacent cell. The CSPs of the plurality of cells may be ranked and managed in order of priority. The eNB 200 includes information about set CSPs of a plurality of cells (a plurality of CSPs) (information indicating the CSPs of the plurality of cells) into SIB (System Information Block) (hereinafter referred to as "system information") and broadcasts the resulting information (step S42). The UE 100 receives the system information (step S42).

After step S42, the UE 100 stores (retains) the CSPs of the plurality of cells included in the system information, in the memory 150 of the UE 100 (step S43).

The eNB 200 sends a paging message at the predetermined condition and timing (trigger) (step S44). The UE 100 receives the paging message (step S44). The paging message includes at least one of a Load re-distribution trigger and a CSP application/non-application instruction. In the second embodiment, it is assumed that both are included.

The "Load re-distribution trigger" means that the eNB 200 instructs the UE 100 to perform the cell reselection process.

From among the "CSP application/non-application instruction", the "CSP application instruction" means that the eNB 200 instructs the UE 100 to apply the CSP. If recognizing (understanding) that the "CSP application instruction" is included in the paging message, the UE 100 performs the cell reselection process based on the CSP stored in the memory 150 in step S43, without using the priority (cellReselectionPriority) of the frequency previously provided from the eNB 200 by the SIB and the like.

It is noted that, if recognizing that the "CSP application instruction" is included in the paging message, the UE 100 may, in the cell reselection process performed later, apply the CSP only once to perform the cell reselection process.

From among the "CSP application/non-application instruction", the "CSP non-application instruction" means that the eNB 200 instructs the UE 100 not to apply the CSP. If recognizing (understanding) that the "CSP non-application instruction" is included in the paging message, the UE 100 performs the cell reselection process based on the priority (cellReselectionPriority) of the frequency previously provided from the eNB 200 by the SIB and the like.

It is noted that the "instruction" in the "CSP application/non-application instruction" may be a "command" or a "request".

After step S44, the UE 100 recognizes (understands) the Load re-distribution trigger and the CSP application/non-application instruction included in the paging message received from the eNB 200 (step S45). The UE 100 performs the cell reselection process according to the recognized content (step S46).

In step S46, the UE 100 detects, at a predetermined timing, a signal from the current serving cell and a signal from the adjacent cell, and performs the cell reselection process based on a detection result.

Even after performing the cell reselection process at a certain timing, the UE 100 retains (continues to retain) the information about the CSPs of the plurality of cells retained (stored) in the memory 150. Based on the retained information about the CSPs of the plurality of cells, the UE 100 performs the cell reselection process at the next timing.

If having succeeded, after the cell reselection process, in receiving system information including new information about the CSPs of the plurality of cells from the eNB 200 configured to manage the reselected cell, the UE 100 stores (retains) the new information in the memory 150. Based on the new information, the UE 100 performs the cell reselection process at the next timing. That is, until receiving, after the cell reselection process, the system information including the new information about the CSPs of the plurality of cells from the eNB 200 configured to manage the reselected cell, the UE 100 performs the cell reselection process at the next timing, based on the information about the CSPs of the plurality of cells retained (stored) in the memory 150.

Therefore, even if, by the cell reselection process, camping on a new cell, the UE 100 can avoid problems (a ping-pong phenomenon of the cell reselection process in the UE 100) assumed from the CSPs of the plurality of cells set by the eNB 200 configured to manage the new cell and the CSPs of the plurality of cells retained in the UE 100 not coinciding.

It is noted that UE 100 overwrites the new information about the CSPs of the plurality of cells from the eNB 200 configured to manage the reselected cell, with the information retained (stored) before (the information about the CSPs of the plurality of cells). After storing (retaining) the new information about the CSPs of the plurality of cells in the memory 150, the UE 100 may delete the information retained (stored) before (the information about the CSPs of the plurality of cells) after a predetermined period.

Third Embodiment

Figure 11:
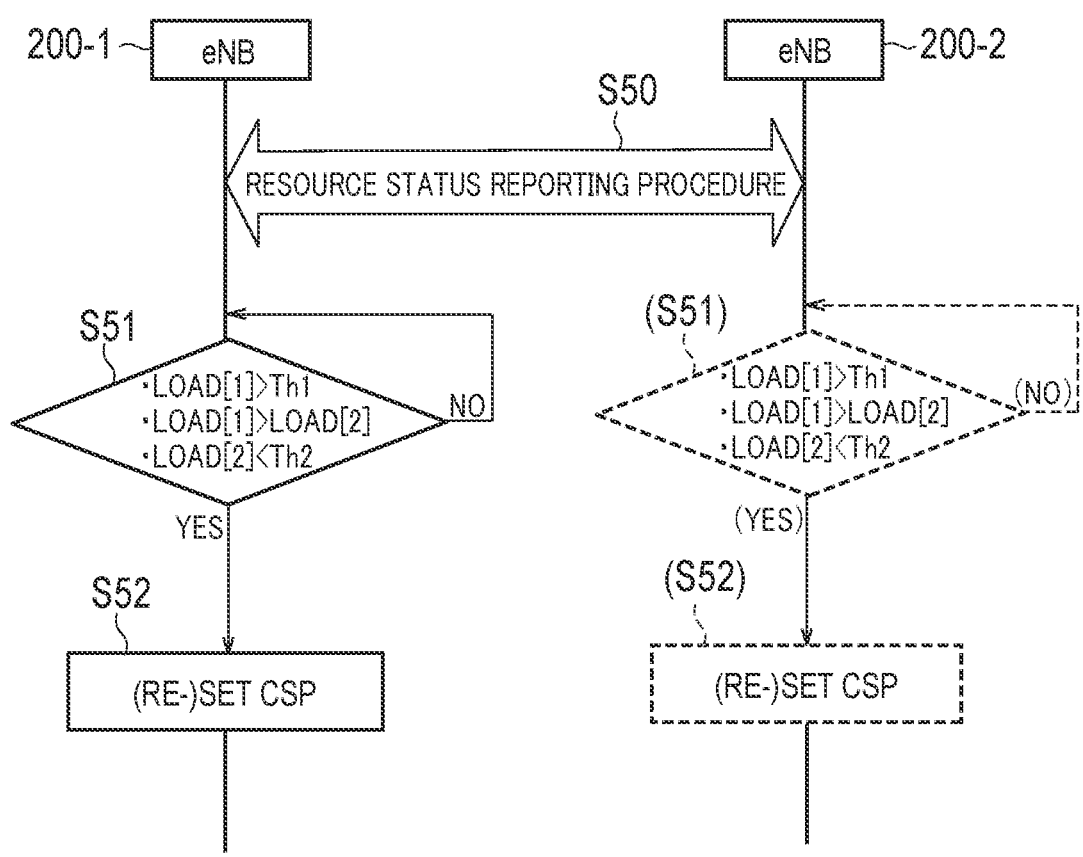
FIG. 11 is a diagram illustrating a process flow of a third embodiment.

FIG. 11 is a diagram showing a process flow of a third embodiment. The third embodiment indicates a content of a process performed between a first eNB (eNB 200-1) and a second eNB (eNB 200-2). In a description of the third embodiment, definitions and the like used in the description of the second embodiment will be appropriately incorporated.

In FIG. 11, the eNB 200-1 and the eNB 200-2 perform, at a predetermined timing, a Resource Status Reporting procedure (step S50). By the procedure, the eNB 200-1 and the eNB 200-2 recognize (understand) a load of each other. Here, the "load" is assumed to indicate a congestion state in the eNB 200-1 (the eNB 200-2) (a number of UEs in a connected state with the eNB 200, and the like).

Next, a relationship is assumed in which a value indicating the load is larger in the eNB 200-1 than in the eNB 200-2. For example, if (B1) the value indicating the load of the eNB 200-1 (Load[1]) is larger than a first predetermined value (Th1), (B2) the value indicating the load of the eNB 200-1 is larger than the value indicating the load of the eNB 200-2 (Load[2]), and further, (B3) the value indicating the load of the eNB 200-2 is smaller than a second predetermined value (Th2) (step S51), the eNB 200-1 re-sets (changes/updates) the CSP set in step S41 (see FIG. 10) (step S52). Specifically, the eNB 200-1 performs re-setting so that the CSP for the eNB 200-1 and the CSP for the eNB 200-2 have equal priority. It is noted that, in this case, it is not considered how high a height (rank) of the priority is.

It is noted that, if the CSP is re-set in step S52, the eNB 200-1 performs re-setting so that the CSP for the cell of the eNB 200-1 has lower priority than the CSP for the cell of the eNB 200-2.

Incidentally, a process having the same content as the process indicated in the above-described step S52 may be performed for the eNB 200-2.

After step S52, the process of step S42 to step S46 in the second embodiment is performed.

Fourth Embodiment

Figure 12:
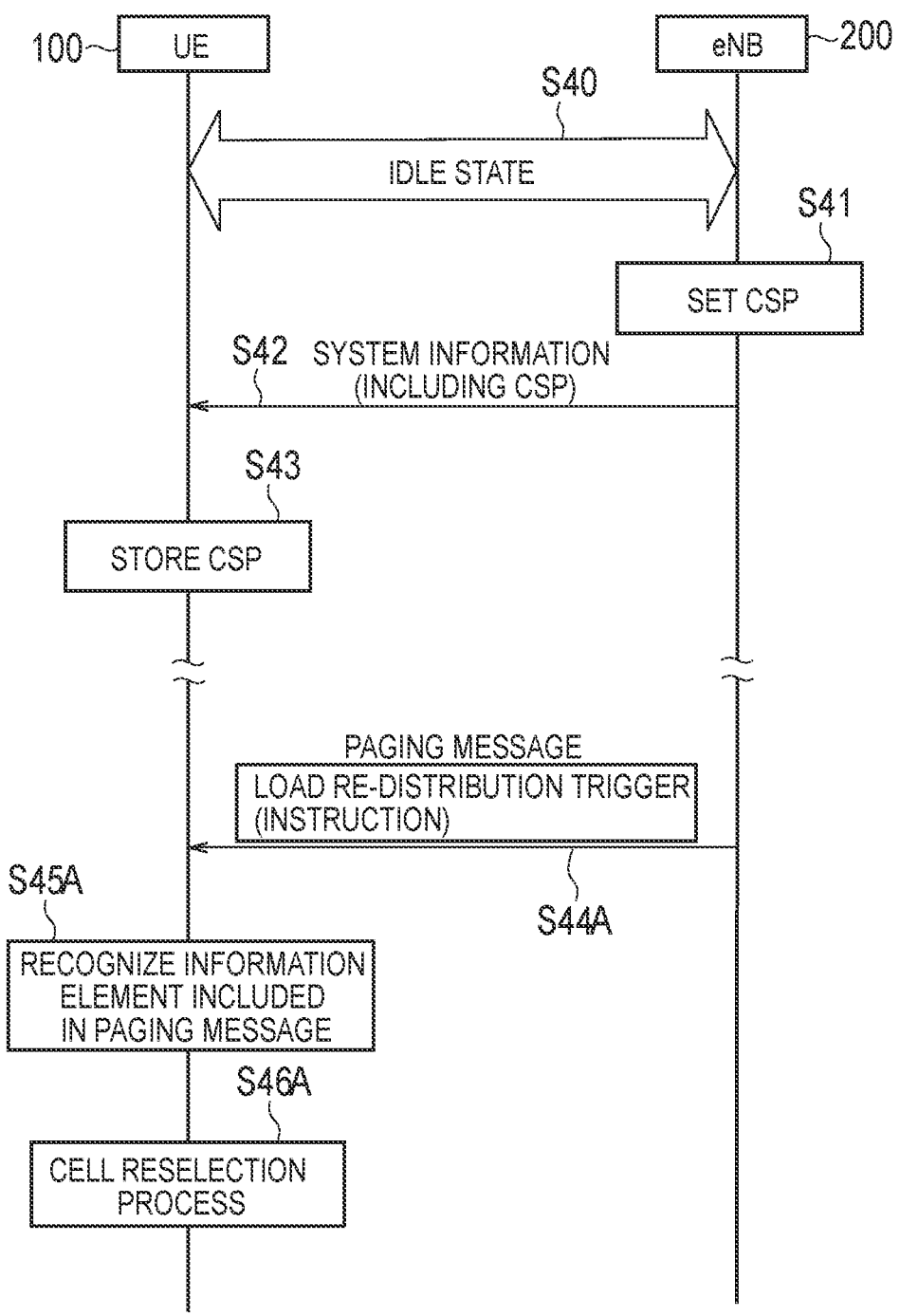
FIG. 12 is a diagram illustrating a process flow of a fourth embodiment.

FIG. 12 is a diagram illustrating a process flow of a fourth embodiment. In the fourth embodiment, the same process as that from step S40 to step S43 in the second embodiment is performed. In the fourth embodiment, a content of a process after step S43 is different from the second embodiment.

In FIG. 12, after step S43, the eNB 200 sends a paging message at the predetermined condition and timing (step S44A). The UE 100 receives the paging message (step S44A). The paging message includes the Load re-distribution trigger. In the fourth embodiment, the CSP application/non-application instruction is not included in the paging message.

The UE 100 recognizes (understands) the Load re-distribution trigger included in the paging message received from the eNB 200 (step S45A). The UE 100 performs the cell reselection process according to the recognized content (step S46A). Here, in step S46A, the UE 100 performs the cell reselection process based on the priority (cellReselection-Priority) of the frequency previously provided from the eNB 200 by the SIB and the like, without applying the CSPs of the plurality of cells stored in the memory 150 (with stopping using the CSPs). In step S46A, the UE 100 measures, at a predetermined timing, the quality of the current serving cell and the quality of the adjacent cell, and performs the cell reselection process based on the measurement result.

Fifth Embodiment

Figure 13:
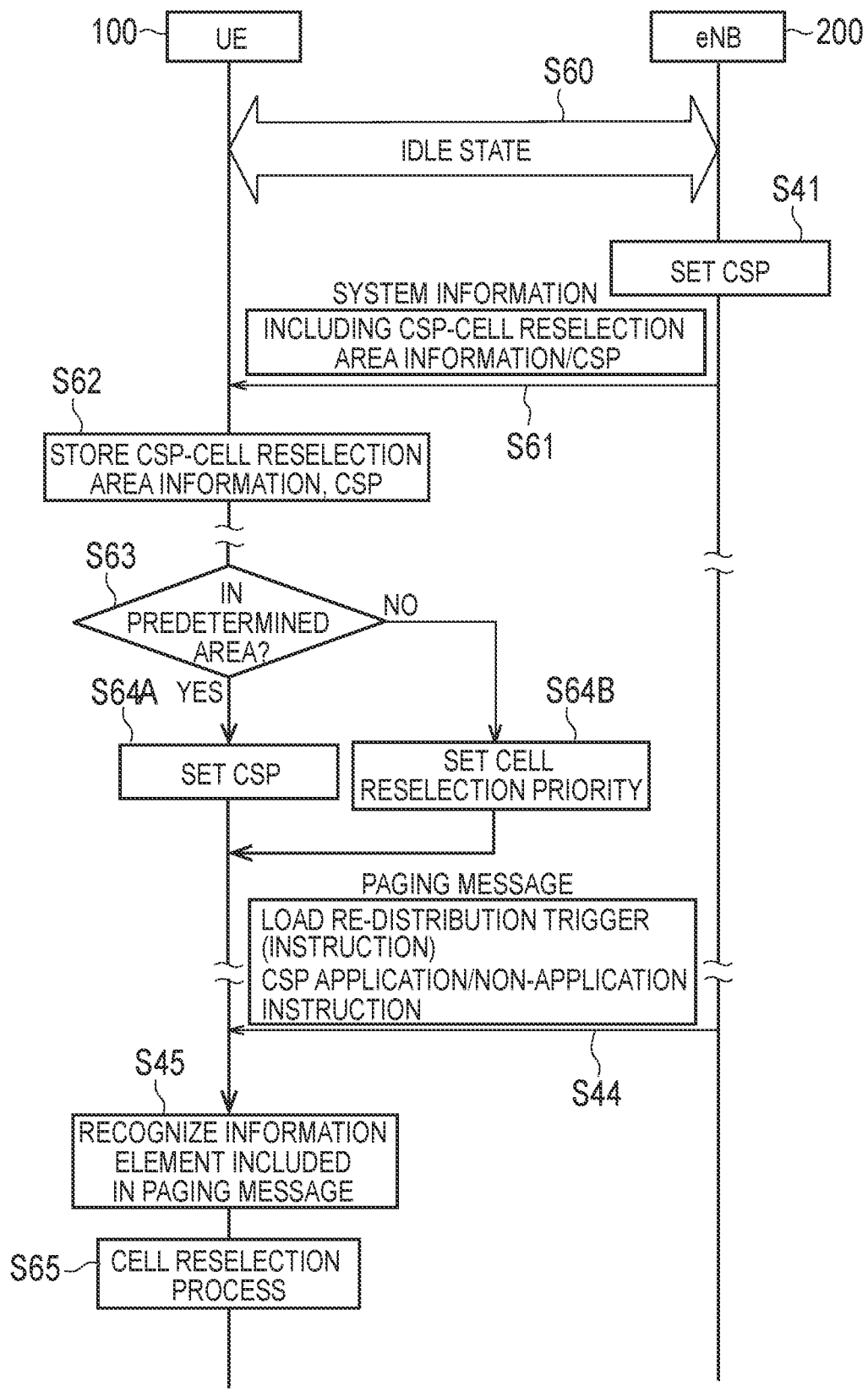
FIG. 13 is a diagram illustrating a process flow of a fifth embodiment.

FIG. 13 is a diagram illustrating a process flow of a fifth embodiment. The fifth embodiment indicates a process for setting a (type of) priority to be applied (used) in the cell reselection process by the eNB 200 (or an entity of the network side) depending on a location of the UE 100.

It is assumed that the eNB 200 (or an entity of the network side) previously sets a predetermined area (place/location) in the cell (serving cell) managed by the eNB 200. The "predetermined area" is an area where the UE 100 needs to perform the cell reselection process based on the CSP. The "predetermined area" may be one or more areas. The "predetermined area" may be set considering an operation environment of a cell of the eNB 200 (for example, a location of a small cell being present in the cell). Further, the "predetermined area" may be changed depending on a change in an operation environment of a cell of the eNB 200 (for example, an increase or decrease in small cells in the cell).

If the UE 100 camps, in an idle state, on a cell of the eNB 200 (step S60), the eNB 200 sends (broadcasts) system information (step S61). The system information includes information indicating the "predetermined area" (CSP-cell reselection area information) and information indicating CSPs of a plurality of cells. In this case, the information indicating the predetermined area (CSP-cell reselection area information) is based on latitude and longitude information. The UE 100 receives system information including the information indicating the "predetermined area" (step S61).

The UE 100 stores (retains) the information indicating the "predetermined area" included in the received system information and the CSPs of the plurality of cells into the memory 150 (step S62). Thus, the UE 100 can recognize (understand), by the information indicating the "predetermined area", an area for which the UE 100 needs to perform the cell reselection process based on the CSP.

After step S62, the UE 100 determines, based on location information of the UE 100 acquired at a predetermined occasion, whether or not the location of the UE 100 is located in the "predetermined area" stored in the memory 150 (step S63). It is noted that, if including a GPS (Global Positioning System) function, the UE 100 acquires the location of the UE 100 by the GPS function. Even if not including the GPS function, the UE 100 may acquire the location information of the UE 100 by a signal from WLAN (Wireless Local Area Network), a signal from a Bluetooth (registered trade name) system, and the like.

In step S63, if detecting (sensing) that the location of the UE 100 is located in the "predetermined area" ("YES" in step S63), the UE 100 sets (selects), as the priority to be used in the cell reselection process, the information about the CSPs of the plurality of cells (the CSPs of the plurality of cells) previously provided from the eNB 200 and stored in the memory 150 (step S64A). It is noted that, in step S64A, the UE 100 does not set (use) the priority (cellReselection-Priority) of the frequency previously provided from the eNB 200 by the SIB and the like, as the priority to be used in the cell reselection process.

In step S63, if not detecting that the location of the UE 100 is located in the "predetermined area" ("NO" in step S63), the UE 100 sets (uses) the priority (cellReselection-Priority) of the frequency previously provided from the eNB 200 by the SIB and the like, as the priority to be used in the cell reselection process (step S64B). It is noted that, in step S64B, even if the UE 100 supposedly stores (retains) the information about the CSPs of the plurality of cells (the CSPs of the plurality of cells) in the memory 150, the UE 100 does not set (use) the CSPs of the plurality of cells as the priority to be used in the cell reselection process.

After step S64A or step S64B, the UE 100 uses the priority set in step S64A or step S64B to perform the cell reselection process at the predetermined timing (step S65). It is noted that, in the fifth embodiment, during a period between step S64A or step S64B and step S65, step S44 and step S45 indicated in the second embodiment are performed, for example.

Sixth Embodiment

Figure 14:
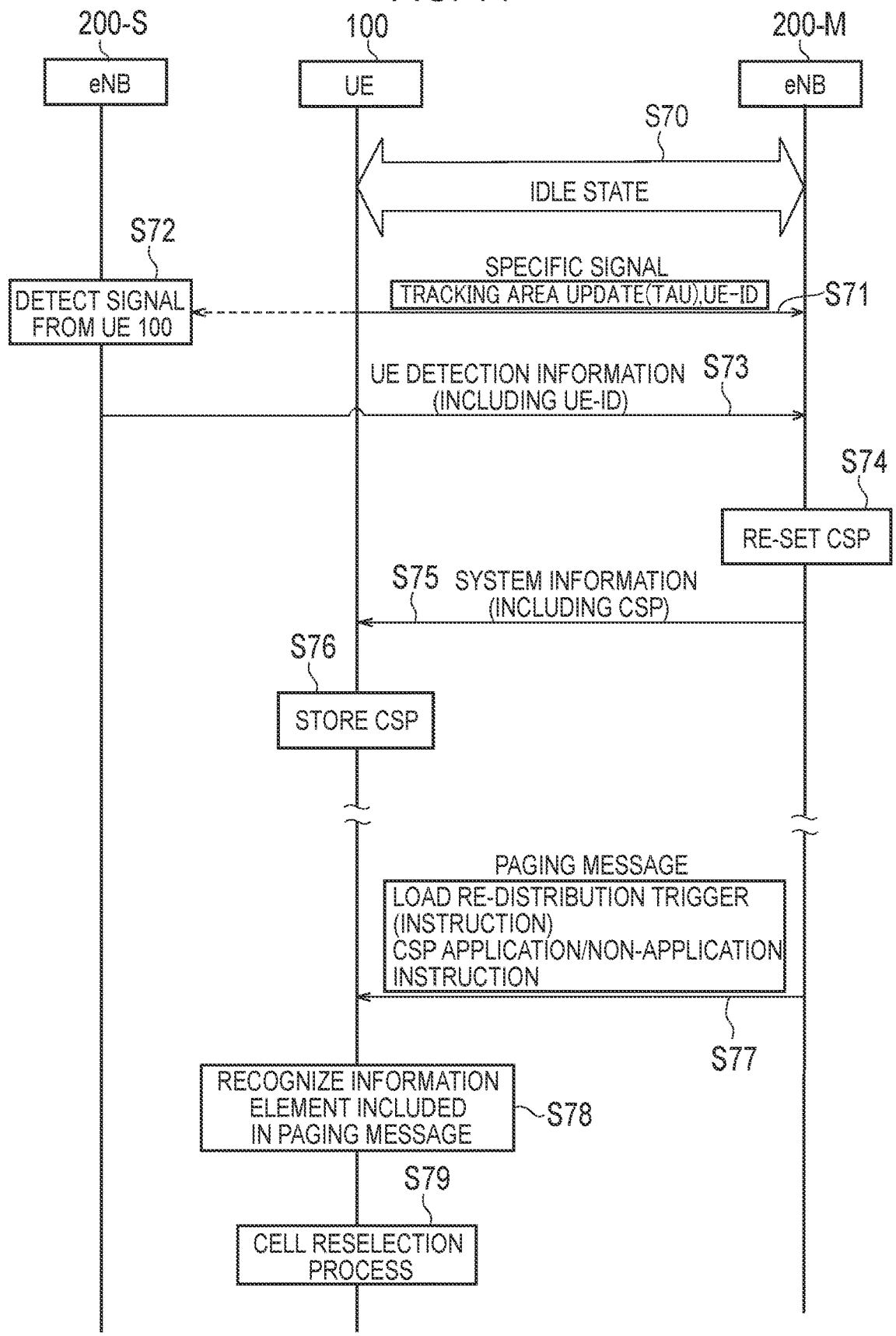
FIG. 14 is a diagram illustrating a process flow of a sixth embodiment.

FIG. 14 is a diagram illustrating a process flow of a sixth embodiment. The sixth embodiment includes a process in which an eNB 200 (eNB 200-M) configured to manage a macro cell sets the CSP for a UE 100 camping on the macro cell, based on a predetermined notification from an eNB 200 (eNB 200-S) configured to manage a small cell arranged in the macro cell.

In FIG. 14, the UE 100 camps, in an idle state, on the eNB 200-M configured to manage the macro cell (step S70). Afterwards, it is assumed that step S41 to step S43 illustrated in FIG. 10 are performed in the eNB 200-M and the UE 100.

Next, the UE 100 sends, in the idle state, at a predetermined occasion, for example, a specific signal including Tracking Area Update (TAU) and a UE-ID being identification information of the UE 100, to the eNB 200-M (step S71). It is noted that the specific signal may be another signal that can be identified as a signal from the UE 100. The "predetermined occasion" may be "regular". Further, the "predetermined occasion" may be "if there is a request from the eNB 200-M".

After step S71, the eNB 200-S configured to manage the small cell detects the specific signal from the UE 100 (step S72). Step S72 is performed if the UE 100 camping on the macro cell of the eNB 200-M moves (is located) near the small cell.

If detecting the specific signal from the UE 100 (step S72), the eNB 200-S sends, to the eNB 200-M, at a predetermined timing, UE detection information indicating that the UE 100 is detected (step S73). The UE detection information is transported via an X2 interface set between the eNB 200-S and the eNB 200-M. It is noted that the UE detection information may be transported from the eNB 200-S to an MME 300 via an S1 interface, and may be transported from the MME 300 to the eNB 200-M via the S1 interface. The UE detection information may include a UE-ID transported by the specific signal.

If receiving the UE detection signal from the eNB 200-S (step S73), the eNB 200-M re-sets the CSPs of the plurality of cells to be applied to the eNB 200-M (step S74). The setting of the CSPs may be performed in an entity of the network side provided in an upper position of the eNB 200-M. The CSPs of the plurality of cells includes a CSP of the macro cell managed by the eNB 200-M and a CSP of an adjacent cell. The adjacent cell includes the small cell managed by the eNB 200-S. The CSPs of the plurality of cells may be ranked and managed in order of priority. In this case, the eNB 200-M (or an entity of the network side) performs ranking so that, for example, a priority of the small cell managed by the eNB 200-S is comparatively lower than a priority of the other adjacent cell.

The eNB 200-M includes information about the CSPs of the plurality of re-set cells (the plurality of CSPs) (information indicating the CSPs of the plurality of cells) into the system information and broadcasts the resulting information (step S75). The UE 100 receives the system information (step S75).

After step S75, the UE 100 stores (retains) the CSPs of the plurality of cells included in the system information, in the memory 150 of the UE 100 (step S76).

After step S76, the eNB 200 sends a paging message at a predetermined condition and timing (trigger) (step S77). The UE 100 receives the paging message (step S77). The paging message includes at least one of a Load re-distribution trigger and a CSP application/non-application instruction. In the sixth embodiment, it is assumed that both are included.

After step S77, the UE 100 recognizes (understands) the Load re-distribution trigger and the CSP application/non-application instruction included in the paging message received from the eNB 200 (step S78). The UE 100 performs the cell reselection process according to the recognized content (step S79).

In the sixth embodiment, if at least step S71 to step S73 are not performed, the UE 100 may perform the cell reselection process based on the priority of the frequency previously provided from the eNB 200 by the system information and the like (cellReselectionPriority).

It is noted that, in the sixth embodiment, an example including the eNB 200-M configured to manage a macro cell and the eNB 200-S configured to manage a small cell is described, however, a size relationship (type) of the cells may be different.

In the sixth embodiment, compared to the fifth embodiment, the location information of the UE 100 is not used. In the sixth embodiment, the eNB 200-M (or an entity of the network side) can set the CSPs of the plurality of cells for the UE 100, by a process in a device of the network side (including the eNB 200-M and the eNB 200-S).

Seventh Embodiment

Figure 15:
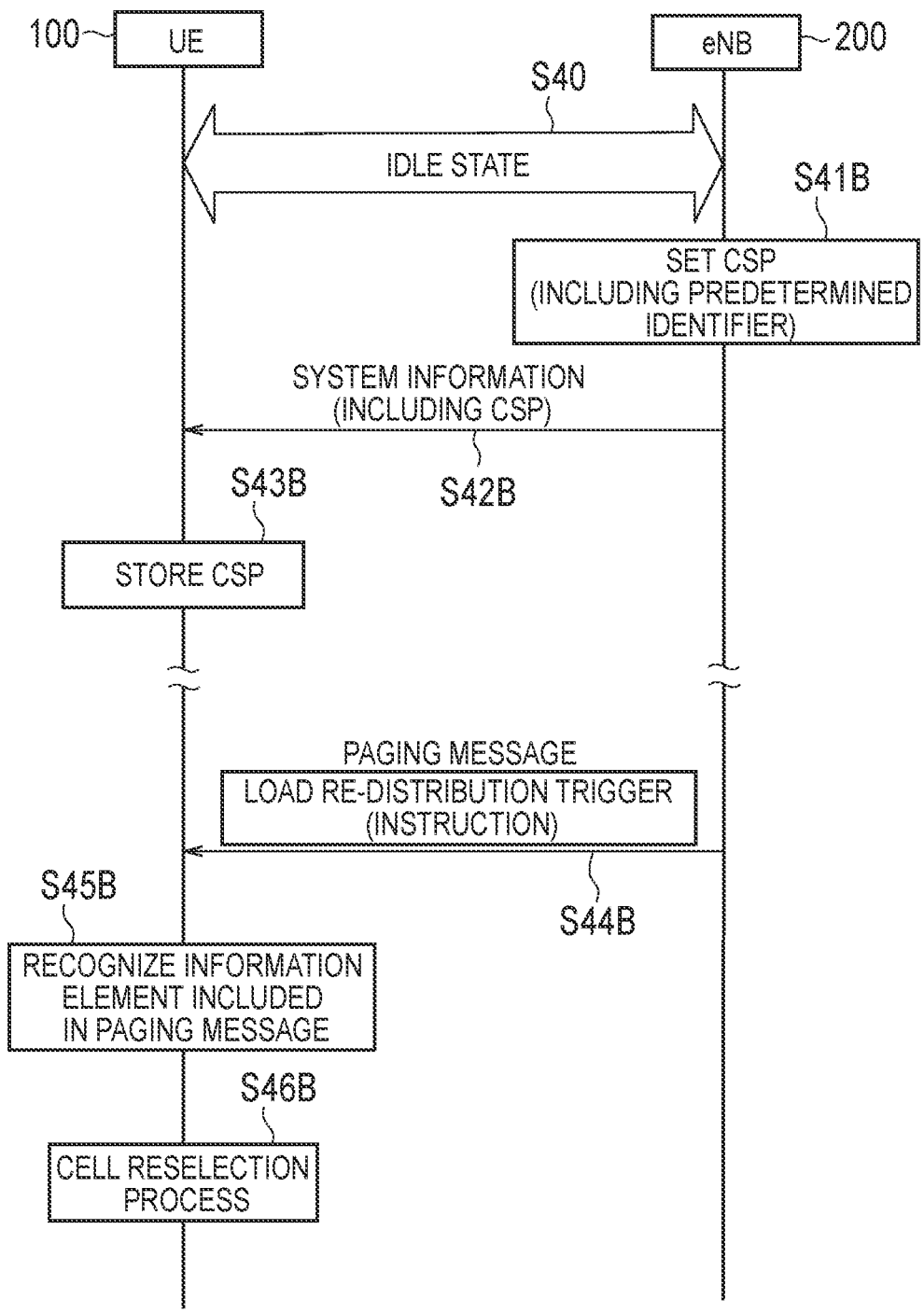
FIG. 15 is a diagram illustrating a process flow of a seventh embodiment.

FIG. 15 is a diagram illustrating a process flow of a seventh embodiment.

In FIG. 15, similarly to the second embodiment, the UE 100 camps, in an idle state, on a cell (serving cell) managed by the eNB 200 (step S40).

The eNB 200 (or an entity of the network side) sets, at a predetermined condition and timing, CSPs of the plurality of cells to be applied in the eNB 200 (step S41B). The CSPs set in step S41A include a predetermined identifier. The "predetermined identifier" indicates whether or not a CSP including the identifier is a CSP applied only in the cell reselection process by paging.

After step S41B, the eNB 200 broadcasts system information including the CSPs of the plurality of cells each including the "predetermined identifier" (step S42B). The UE 100 receives the system information (step S42B).

After step S42, the UE 100 stores (retains) the CSPs of the plurality of cells included in the system information (the CSPs each including the "predetermined identifier"), in the memory 150 (step S43B).

After step S43B, the eNB 200 sends a paging message at the predetermined condition and timing (step S44B). The UE 100 receives the paging message (step S44B). The paging message includes the Load re-distribution trigger. In the seventh embodiment, the CSP application/non-application instruction is not included in the paging message.

The UE 100 recognizes (understands) the Load re-distribution trigger included in the paging message received from the eNB 200 (step S45B). The UE 100 performs the cell reselection process according to the recognized content (step S46B). In step S46B, if it is indicated that the "predetermined identifier" each included in the CSPs of the plurality of cells stored in the memory 150 is a CSG only applied in the cell reselection process by paging, the UE 100 performs the cell reselection process by using a CSP including the "predetermined identifier". The UE 100 does not use the priority of the frequency previously provided from the eNB 200 by the system information and the like (cellReselectionPriority).

Eighth Embodiment

Figure 16:
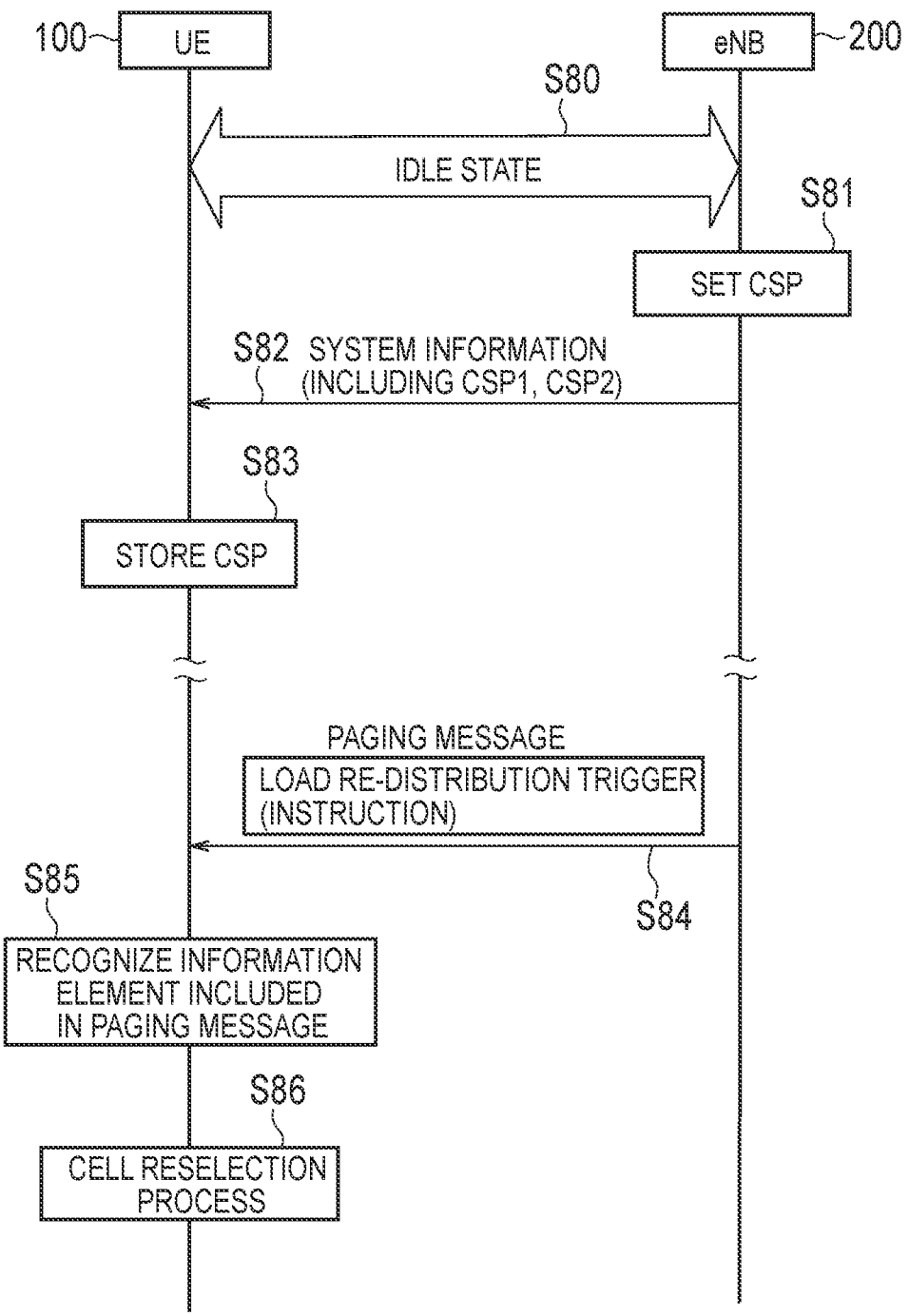
FIG. 16 is a diagram illustrating a process flow of an eighth embodiment.

FIG. 16 is a diagram illustrating a process flow of an eighth embodiment. In the description of the eighth embodiment, the content described, for example, in the second embodiment and the like will be appropriately incorporated. In FIG. 16, the UE 100 camps, in an idle state, on the cell (serving cell) managed by the eNB 200 (step S80). The eNB 200 (an entity of the network side) sets, at the predetermined condition and timing, the CSPs of the plurality of cells to be applied in the eNB 200 (step S81).

In step S81, the eNB 200 (an entity of the network side) sets a first CSP (CSP1) and a second CSP (CSP2). The first CSP is a priority used if the UE 100 performs the cell reselection process, without the reception of the paging message from the eNB 200 as an opportunity. The first CSP includes the CSPs of the plurality of cells. The CSPs of the plurality of cells includes a CSP of the cell managed by the eNB 200 and a CSP of the adjacent cell. The CSPs of the plurality of cells may be ranked and managed in order of priority.

The first CSP is applied similarly to the priority of the frequency (cellReselectionPriority). If not receiving the paging message from the eNB 200, the UE 100 performs the cell reselection process based on the first CSP at the predetermined condition and timing. In this case, the UE 100 continuously applies the first CSP, for example. It is noted that, if not receiving the paging message from the eNB 200, the UE 100 may perform, at the predetermined condition and timing, the cell reselection process based on the priority of the frequency (cellReselectionPriority), according to another criteria (condition) instead of the first CSP.

The second CSP is a priority used if the UE 100 performs the cell reselection process in a case of receiving the paging message from the eNB 200. The second CSP includes the CSPs of the plurality of cells. The CSPs of the plurality of cells include the CSP of the cell managed by the eNB 200 and/or the CSP of the adjacent cell. The CSPs of the plurality of cells may be ranked and managed in order of priority.

A content of the priority of the plurality of cells (for example, a ranking content) is different between the first CSP and the second CSP. For example, compared to the first CSP, the second CSP is set so that the priority of the cell (serving cell) of the eNB 200 configured to transmit the paging message is low. Further, compared to the first CSP, the second CSP may be set so that the priority of the cell (serving cell) of the eNB 200 configured to transmit the paging message is high. Moreover, the first CSP and the second CSP may be set so that the priority between the plurality of cells is different.

The eNB 200 includes information about the CSPs of the plurality of set cells (the plurality of CSPs) (information indicating the CSPs of the plurality of cells) into the system information and broadcasts the resulting information (step S82). In step S82, the eNB 200 includes at least any one of the first CSP and the second CSP into the system information and broadcasts the resulting information. In FIG. 16, it is assumed that the system information includes both the first CSP and the second CSP. The UE 100 receives the system information (step S82). It is noted that the first CSP and the second CSP may each be associated with a different identifier (for example, an "identifier indicating a continuous application purpose" or an "identifier indicating a temporary application purpose").

After step S82, the UE 100 stores (retains) the CSPs of the plurality of cells included in the SIB (the first CSP and the second CSP), in the memory 150 of the UE 100 (step S83).

The eNB 200 sends the paging message at the predetermined condition and timing (trigger) (step S84). The UE 100 receives the paging message (step S84). The paging message includes at least one of the Load re-distribution trigger and the CSP application/non-application instruction. In FIG. 16, a case is illustrated in which the paging message includes the "Load re-distribution trigger" and does not include the CSP application/non-application instruction.

After step S84, the UE 100 recognizes (understands) the Load re-distribution trigger included in the paging message received from the eNB 200 (step S85). The UE 100 performs the cell reselection process according to the recognized content using the second CSP (step S86).

It is noted that, in the eighth embodiment, the eNB 200 (an entity of the network side) sets both of the first CSP and the second CSP, includes the set first CSP and second CSP into the system information and broadcasts the resulting information, however, at each predetermined timing, only either one of the CSPs may be set, included into the system information and broadcast. In this case, a process of a "step A" and a "step B" illustrated next is performed, for example. [Step A-1]: At a first timing, the eNB 200 broadcasts first system information, configuring the "first CSP", but not configuring the "second CSP" and the "Load re-distribution trigger". [Step A-2]: The UE 100 receives this first system information to store this information into the memory 150. [Step B-1]: At a second timing being a timing after the first timing, the eNB 200 broadcasts second system information, configuring the "second CSP" and the "Load re-distribution trigger", but not configuring the "first CSP". [Step B-2]: The UE 100 receives the second system information. The UE 100 may store an information element of the "second CSP" in the memory 150 so as to temporarily overwrite an information element of the "first CSP" stored in the memory 150 in "step A-2". If "step B" is not performed after "step A", the UE 100 may use the "first CSP" (continue use of the "first CSP") to perform the cell reselection process.

Ninth Embodiment

FIG. 17 is a diagram illustrating a process flow of a ninth embodiment. In the ninth embodiment, mainly contents of step S84 and step S85 are different from those in the eighth embodiment. Compared to the eighth embodiment, contents of steps S80 to S83 and step S86 in the ninth embodiment are mostly the same.

First, in step S82, the first CSP and the second CSP included in the system information broadcast from the eNB 200 are previously associated with index information for identifying a type of the CSP (CSP index information). A method of using the CSP index information is described later.

After step S83, the eNB 200 sends a paging message at a predetermined condition and timing (trigger) (step S84A). The UE 100 receives the paging message (step S84A). The paging message includes at least one of the Load re-distribution trigger and the CSP application/non-application instruction. In FIG. 17, a case is illustrated in which the paging message includes the "Load re-distribution trigger" and does not include the "CSP application/non-application instruction".

Further, the CSP index information is included in the paging message. The CSP index information indicates if the CSP to be used by the UE 100 in the cell reselection process is the first CSP or the second CSP. The CSP index information is simple information indicated in 1-bit information. The CSP index information being "0" means that the CSP is the "first CSP" and the CSP index information being "1" means that the CSP is the "second CSP". Further, the CSP index information being "0" may mean that the CSP is the "second CSP" and the CSP index information being "1" may mean that the CSP is the "first CSP". Moreover, the CSP index information may be 2 or more bits of information. In this case, by the CSP index information configured by the 2 or more bits of information, a third CSP (or a fourth CSP and onward) may be notified.

In step S84A, the UE 100 receives the paging message from the eNB 200.

After step S84A, the UE 100 recognizes (understands) the "Load re-distribution trigger" and the "CSP index information" included in the paging message received from the eNB 200 (step S85A). Further, it is assumed that the UE 100 previously recognizes which CSP the "CSP index information" indicates. Thus, the UE 100 can recognize that the cell reselection process needs to be performed by the "Load re-distribution trigger" and recognize, by the "CSP index information", which of the "first CSP" or the "second CSP" needs to be used as the CSP used in the cell reselection process.

After step S85A, the UE 100 uses the CSP (the first CSP or the second CSP) recognized by the "CSP index information" to perform the cell reselection process (step S86).

It is noted that, in the present embodiment, the Load re-distribution process trigger is assumed to be a paging message, but this is not limiting. For example, a group being notified in the above-described "second modification" may be regarded as the Load re-distribution process trigger. Alternatively, a threshold value being notified in the above-described "third modification" may be regarded as the Load re-distribution process trigger. Alternatively, the "reference trigger" in the above-described "fourth modification" may be assumed to be the Load re-distribution process trigger. Alternatively, the "reselection request signal" in the above-described "fifth modification" may be assumed to be the Load re-distribution process trigger. Alternatively, the paging signal including the "reselection request signal" in the above-described "seventh modification" may be assumed to be the Load re-distribution process trigger. It should be noted that, in these application, the "Load re-distribution trigger" and the "CSP application/non-application instruction" in the present embodiment may be included in the system information (SIB).

Although not particularly mentioned in each of the embodiments described above, a program for causing a computer to execute each process performed by the UE 100 and the eNB 200 may be provided. Furthermore, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a CD-ROM and a DVD-ROM, for example.

Alternatively, a chip may be provided which is constituted of; a memory in which a program for performing each process performed by the UE 100 and the eNB 200 is stored; and a processor for executing the program stored in the memory.

In the embodiments, the LTE system is described as an example of the mobile communication system. However, the embodiments are not limited thereto. The mobile communication system may be a system other than the LTE system.

APPENDIX

1. Introduction

In RAN2 #91, RAN2 agreed to adopt the cell specific priorities (CSP) as the baseline. Adopt cell specific priorities as baseline In this Appendix, a possible mechanism based on the concept of CSP is discussed.

2. Discussion 2.1. Cell Specific Priorities (CSP)

The concept of CSP was proposed to have the cell reselection priority for a specific cell, in addition to the existing frequency dependent priority. It has the potential to fulfill requirement 4), since requirement 4) cannot be met using the existing cell reselection scheme as agreed in RAN2 #90.

Agreements 1. Following Requirements can't be met by existing cell reselection scheme:

1) It should be possible under network control to re-distribute among the different carriers a fraction of users currently camped on these carriers 4) It should be possible to control the load distribution among individual cells rather than only on a carrier level (for example the scenario that the macro cell in a co-channel Het-Net deployment and/or certain small cells on another carrier may be overloaded)

Observation 1 CSP has the Potential to Fulfill Requirement 4).

However, it should be further considered if CSP can also satisfy requirement 1), i.e., "It should be possible under network control to re-distribute among the different carriers a fraction of users currently camped on these carriers". A different solution is also proposed in which is specifically designed to satisfy requirement 1) which is based on an one-shot mechanism. Considering the need to discuss solutions for satisfying requirement 1, it would appear CSP alone cannot be used to fulfill both requirements, i.e., 1) and 4).

Observation 2 CSP Alone Cannot Satisfy Requirement 1).

Instead of using completed separate mechanisms for meeting both requirement 1) and 4), it should be considered if another mechanism could be used on top of CSP to allow the network to have sufficient flexibility to meet both requirements. In particular, CSP may be used in combination with either continuous randomization or one-shot mechanism to satisfy both requirements. So, RAN2 should aim to a single solution to fulfill both requirements simultaneously, i.e., "Solution should be able to move fraction of the UEs from one cell to another cell" as agreed in RAN2 #90.

Proposal 1 RAN2 should aim to a single solution which should be able to move fraction of the UEs from one cell to another cell and can meet both requirements 1) and 4).

2.2. Paging-Triggered CSP

Assuming Proposal 1 is considered a viable solution, RAN2 should consider which combination of solutions should be further discussed. If it is to use the continuous randomization, e.g., the randomized threshold offset, in combination with CSP, it may achieve the desired outcome for fulfilling both requirements. However, such a combination approach will potentially cause unnecessary complexity in practical operations since this combination is built on two different solutions, i.e., with possibly two separate UE behaviours.

Another approach is to consider the one-shot re-distribution mechanism using an enhancement to the paging message. The paging message could point to a deterministic fraction of UEs on individual paging frame/occasion basis, and it has the potential to offer similar performance improvements as compared to the solutions based on random value generation within the UEs. So, although CSP is likely assumed to be applied continuously, it's worth considering whether the paging message could be used to indicate which fraction of UEs should apply CSP. With this approach, mass-reselection to the prioritized cell can be avoided, and furthermore, it would be possible to apply different priority configurations to different fractions of UEs at a given time. It will also reduce UE's burden for inter-frequency measurements in some cases. If needed, the serving cell could also instruct all UEs to be applied CSP, if the serving cell provides the indication in every paging frames/occasions.

Proposal 2 The paging message should indicate the trigger of load re-distribution and whether the cell specific priority is applied.

If Proposal 2 is acceptable, it should be considered how the UE behaves upon reception of the indication through the paging. Considering the complex deployments and issues presented in, the solution should have scalability for different load re-distribution strategies. One of possible cases for the normal load condition is to move a fraction of UEs to a specific cell which experiences lower relatively load. Since the eNB is able to obtain the load conditions of the neighbour cells/eNBs, e.g., by means of the resource status update over X2, the eNB may determine which cell the UEs should move to. In this case, the eNB may set the neighbour cell(s) with higher priority. Another possibility is for the overloaded cell to initiate the load re-distribution to move a fraction of UEs to less loaded cells/frequencies. Since the goal is to achieve a balanced load within the network after the load re-distribution, the cell specific prioritization triggered by the paging message would be applied only once per corresponding cell reselection procedure. Note that if the trigger is sent repeated then the UE should apply the cell specific priority repeatedly at every cell reselection procedure.

Proposal 3 When the UE receives the enhanced paging message with the CSP indication, the UE applies a one-shot cell reselection procedure using the corresponding cell specific prioritization parameters It should also be considered how the cell specific parameters are provided. If Proposal 2 and Proposal 3 are agreeable, one possibility is to provide the parameters within the paging message, although the original concept of CSP assumes SIB. Considering HetNet deployments, it could be assumed that there are many small cells in a macro cell coverage, and the macro cell may have to provide many cell specific parameters corresponding to each small cell. In addition, the solution should have scalability to be applicable to not only one-shot mechanism but also continuous randomization. Therefore, to minimize the size of the paging message, the cell-specific parameters should be provided in SIB.

Proposal 4 The parameters for cell specific prioritization should be provided in SIB.

In addition, it may be considered if the original CSP is still useful in some deployments and how the original CSP should coexist with the enhanced CSP. Two options may be considered;

Option 1: SIB provides one set of the cell specific prioritization parameters and an additional indication whether the parameters should be applicable only when the UE receives a page or whether the parameters should be applicable continuously without the use of paging.

Option 2: SIB provides two independent sets of cell specific prioritization parameters for the original CSP and the enhanced CSP. A set of the parameters for the enhanced CSP is applicable only when the UE receives a page. It's FFS whether the enhanced CSP has multiple sets of parameters categorized by indices used for association with paging frames/occasions.

Proposal 5 RAN2 should consider the details of parameter provisioning based on the above options.

INDUSTRIAL APPLICABILITY

The present invention is useful in the field of communication.

The invention claimed is:

1. A user terminal comprising a controller, wherein
   if the user terminal is in an RRC (Radio Resource Control) idle state, the controller executes the processes of:
   receiving, from a base station, first cell-specific priorities and second cell-specific priorities applied to a cell reselection process where the user terminal selects a cell as a serving cell from among a plurality of cells, each of the first cell-specific priorities assigned to each of the plurality of cells, each of the second cell-specific priorities assigned to each of the plurality of cells, a first cell-specific priority of a cell of the plurality of cells being different from a second cell-specific priority of the cell of the plurality of cells, wherein
       the first cell-specific priorities are applied to the cell reselection process triggered by receiving a satisfying a predetermined condition except the reception of the paging message, and
       the second cell-specific priorities are applied to the cell reselection process triggered by receiving a paging message including an instruction to trigger the cell reselection process;
   receiving, from the base station, the paging message including an instruction to trigger the cell reselection process;
   executing the cell reselection process by using the second cell-specific priorities, in response to the reception of the paging message; and
   executing the cell reselection process by using the first cell-specific priorities, in response to satisfying the predetermined condition.
2. The user terminal according to claim 1, wherein
   the second cell-specific priority of the cell is set based on at least one of load state of the cell and a type of the cell.

3. The user terminal according to claim 1, wherein
the controller further executes the process of:
retaining the second cell-specific priority after the executing the cell reselection process until receiving another cell-specific priority.

4. A base station comprising a controller, wherein
the controller executes the processes of:
broadcasting first cell-specific priorities and second cell-specific priorities applied to a cell reselection process where the user terminal selects a cell as a serving cell from among a plurality of cells, each of the first cell-specific priorities assigned to each of the plurality of cells, each of the second cell-specific priorities assigned to each of the plurality of cells, a first cell-specific priority of a cell of the plurality of cells being different from a second cell-specific priority of the cell of the plurality of cells, wherein
   the first cell-specific priorities are applied to the cell reselection process triggered by satisfying a predetermined condition except the reception of the paging message, and
   the second cell-specific priorities are applied to the cell reselection process triggered by receiving a paging message including an instruction to trigger the cell reselection process; and
broadcasting the paging message including an instruction to trigger the cell reselection process.

5. The base station according to claim 4, wherein
the second cell-specific priority of the cell is set based on at least one of load state of the cell and a type of the cell.

6. The base station according to claim 4, wherein
the controller further executes the processes of:
obtaining first load information indicating load of adjacent base stations adjacent to the base station from the adjacent base stations;
obtaining second load information indicating load of the base station; and
setting the second cell-specific priority based on the first load information and the second load information.

* * * * *